(12) United States Patent
Park

(10) Patent No.: US 10,593,349 B2
(45) Date of Patent: Mar. 17, 2020

(54) EMOTIONAL INTERACTION APPARATUS

(71) Applicant: The George Washington University, Washington, DC (US)

(72) Inventor: Chung Hyuk Park, McLean, VA (US)

(73) Assignee: The George Washington University, Washington, DC (US)

(*) Notice: Subject to any disclaimer, the term of this patent is extended or adjusted under 35 U.S.C. 154(b) by 13 days.

(21) Appl. No.: 15/625,747

(22) Filed: Jun. 16, 2017

(65) Prior Publication Data

US 2017/0365277 A1  Dec. 21, 2017

Related U.S. Application Data

(60) Provisional application No. 62/350,923, filed on Jun. 16, 2016.

(51) Int. Cl.
| | |
|---|---|
| G06K 9/66 | (2006.01) |
| G10L 25/63 | (2013.01) |
| G10L 15/06 | (2013.01) |
| G10L 15/18 | (2013.01) |
| G10L 15/02 | (2006.01) |
| G10L 15/22 | (2006.01) |
| G06F 17/27 | (2006.01) |

(52) U.S. Cl.
CPC ......... *G10L 25/63* (2013.01); *G06F 17/2785* (2013.01); *G10L 15/02* (2013.01); *G10L 15/063* (2013.01); *G10L 15/1807* (2013.01); *G10L 15/1815* (2013.01); *G10L 15/22* (2013.01); *G06K 9/66* (2013.01)

(58) Field of Classification Search
CPC ....................................................... G06K 9/66
See application file for complete search history.

(56) References Cited

U.S. PATENT DOCUMENTS

| | | | | |
|---|---|---|---|---|
| 2003/0139654 A1* | 7/2003 | Kim | ................... | A61B 5/02405 600/300 |
| 2003/0204398 A1* | 10/2003 | Haverinen | .............. | G10L 15/20 704/233 |
| 2014/0112556 A1* | 4/2014 | Kalinli-Akbacak | .... | G10L 25/63 382/128 |

* cited by examiner

*Primary Examiner* — Feng-Tzer Tzeng
(74) *Attorney, Agent, or Firm* — Blank Rome LLP

(57) ABSTRACT

A system and method for emotional interaction. The system includes a robot that uses behavioral analysis automation to provide treatment and assessment of emotional communication and social skills for children with autism. The system generates a dataset including speech signals of one or more speakers, and assigns at least one of a set of labels to each of the speech signals for the one or more speakers. The set of labels includes at least three levels of emotional dimensions, the emotional dimensions include at least activation, valence, and dominance, and the at least three levels of emotional dimensions include a high state, a neutral state, and a low state.

24 Claims, 16 Drawing Sheets

EMOTIONAL INTERACTION APPARATUS

RELATED APPLICATIONS

This application claims the benefit of U.S. Provisional Application No. 62/350,923, filed Jun. 16, 2016, the entire contents of which are incorporated herein by reference.

GOVERNMENT LICENSE RIGHTS

This invention was made with Government support under Grant/Contract No. NIH NICHD #5-R01-HD082914-04: "NRI: Music-based Interactive Robotic Orchestration for Children with ASD." awarded by NIH. The Government has certain rights in this invention.

BACKGROUND OF THE INVENTION

Field of the Invention

The present invention relates to an emotional interaction apparatus. More particularly, the present invention relates to robotic therapy using behavioral analysis automation to provide treatment and assessment of emotional communication and social skills for children with autism.

Background of the Related Art

Autism spectrum disorder (ASD) is a neurological disorder that can, to varying extent, bring social, communication, and behavioral challenges. The number of cases has increased in children born between 1992 to 2002 with 1 in 150 children being diagnosed in 1992 to 1 in 68 children with ASD in 2002. On average, as of 2014, Autism services cost U.S. citizens between $236-262 billion annually. These various services include school district costs towards servicing special needs children, including children with ASD. Studies have shown that early diagnosis and intervention can save these national costs by as much two-thirds.

In the United States, this rapid increase in the population of children with autism spectrum disorder (ASD) has revealed the deficiency in the realm of therapeutic accessibility for children with ASD in the domain of emotion and social interaction. There have been a number of approaches including several robotic therapeutic systems [1] displaying many intriguing strategies and meaningful results. However, the spectral diversity of ASD is so vast that we still need to push forward research to provide parameterized therapeutic tools and frameworks.

To overcome this challenge, state-of-the-art techniques must still be developed to facilitate autonomous interaction methods for robots to effectively stimulate the emotional and social interactivity of children. We focus on the recent studies that reveal strong relevance in premotor cortex among neural domains for music, emotion, and motor behaviors. Musical interaction and activities can provide a new therapeutic domain for effective development in the children's emotion and social interaction.

A form of auditory stimulus, called rhythmic auditory stimulation (RAS), is well-established in neurological rehabilitation and therapy [2, 3]. RAS is a method in which the rhythm functions as a sensory cue to induce temporal stability and enhancement of movement patterns by providing a temporal constraint for the patient's internal optimized path of motion. In this sense, RAS can be an effective means for inducing social engagement and emotional activities. Neurological studies have shown that activity in the premotor cortex may represent the integration of auditory information with temporally organized motor action during rhythmic cuing. Based on this theory, researchers have shown that RAS can produce significant improvements in physical activities [4]. Given that music has shown such a long history of therapeutic effects on psychological and physical problems, we suggest that music, being a metaphysical integration of sound elements formed around emotional flow and thematic context, can serve as the effective and higher-level stimulus for emotional and motor responses of children with ASD.

Human-robot interaction has been a fast growing field of research, having its application domains on social interaction, assistive robotics, behavioral therapy, and educational robotics. Study on regulating and expressing emotions through physical or animation-based facial expressions through robotic platforms has been conducted with many systems [5, 6].

What needs to be researched further now, given that there are sufficient work on artificial representation of emotions through robotic agents, is that an efficient framework for modeling and guiding the emotional interaction between human and robots. For the interaction with robots to have some implications on the daily lives of humans, the robot should be equipped with its own control mechanism for regulating its emotional status for the purpose of causing positive changes on the emotional status of humans. For this purpose, we take the approach of agent-based emotional interaction using a consensus-based approach [7].

Robotic emotions, which enables a robotic entity to function as a social agent, has made consistent progress over the past decades. Breazeal's artificial facial expression framework has inspired many research projects in social robotics, and Scassellati's approach based on the Theory of Mind has enabled diverse multi-disciplinary approaches in terms of human robot interaction. Study on the effects of robotic facial expression in terms of interactive learning scenarios [8] and turn-taking based methodology in terms of human-robot interaction were among many exemplary research in social robotics.

SUMMARY OF THE INVENTION

It is one object of the invention to provide an emotional interaction apparatus. It is a further object of the invention to provide robotic therapy using behavioral analysis automation to provide treatment and assessment of emotional communication and social skills for children with autism.

In accordance with these and other objects, the present invention provides a system and method for emotional interaction. The system includes a robot that uses behavioral analysis automation to provide treatment and assessment of emotional communication and social skills for children with autism. The system generates a dataset including speech signals of one or more speakers, and assigns at least one of a set of labels to each of the speech signals for the one or more speakers. The set of labels includes at least three levels of emotional dimensions, the emotional dimensions include at least activation, valence, and dominance, and the at least three levels of emotional dimensions include a high state, a neutral state, and a low state.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1A:
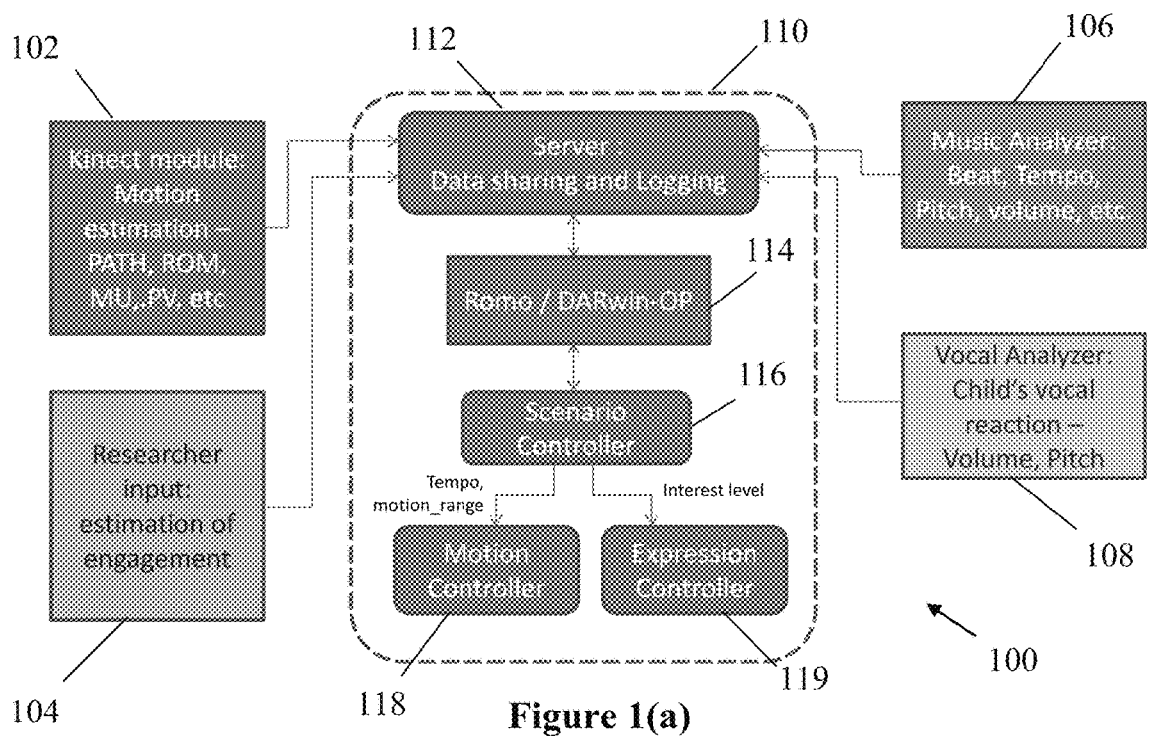
FIGS. 1(a) and 1(b) are block diagrams of the multi-modal perception and robot control architecture in accordance with the present invention.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 1B:
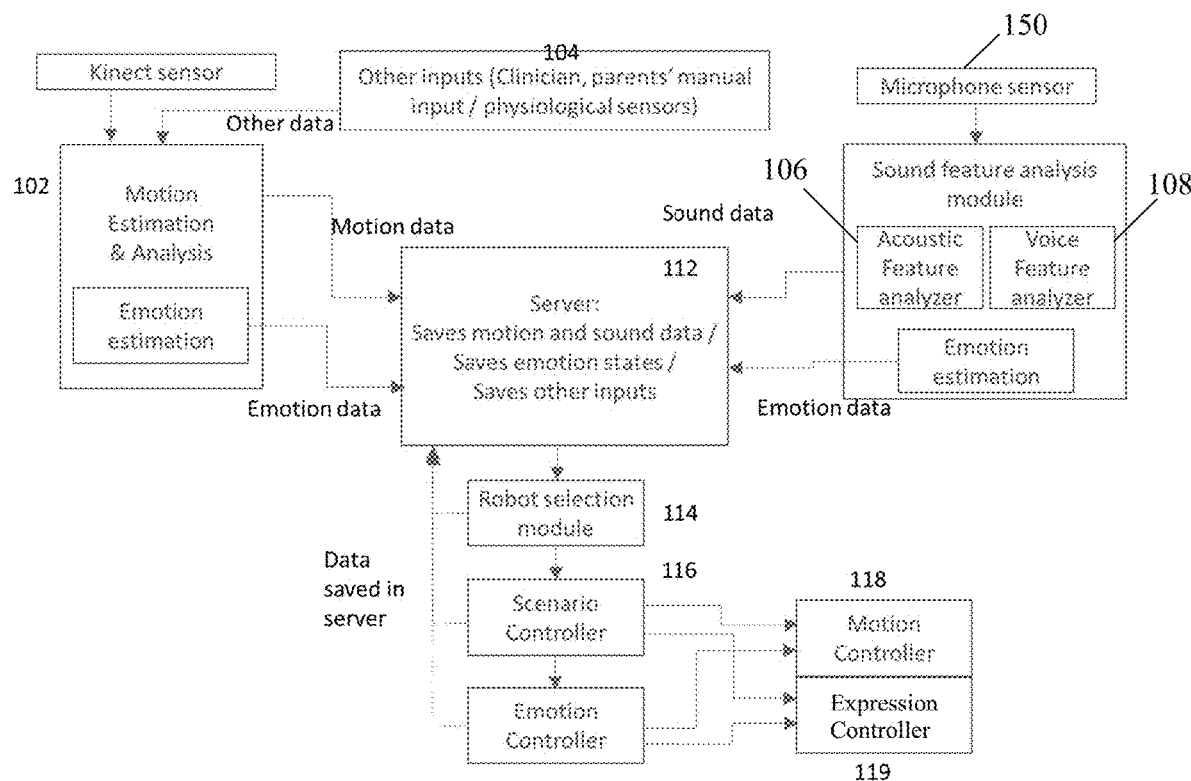
Figure 11:
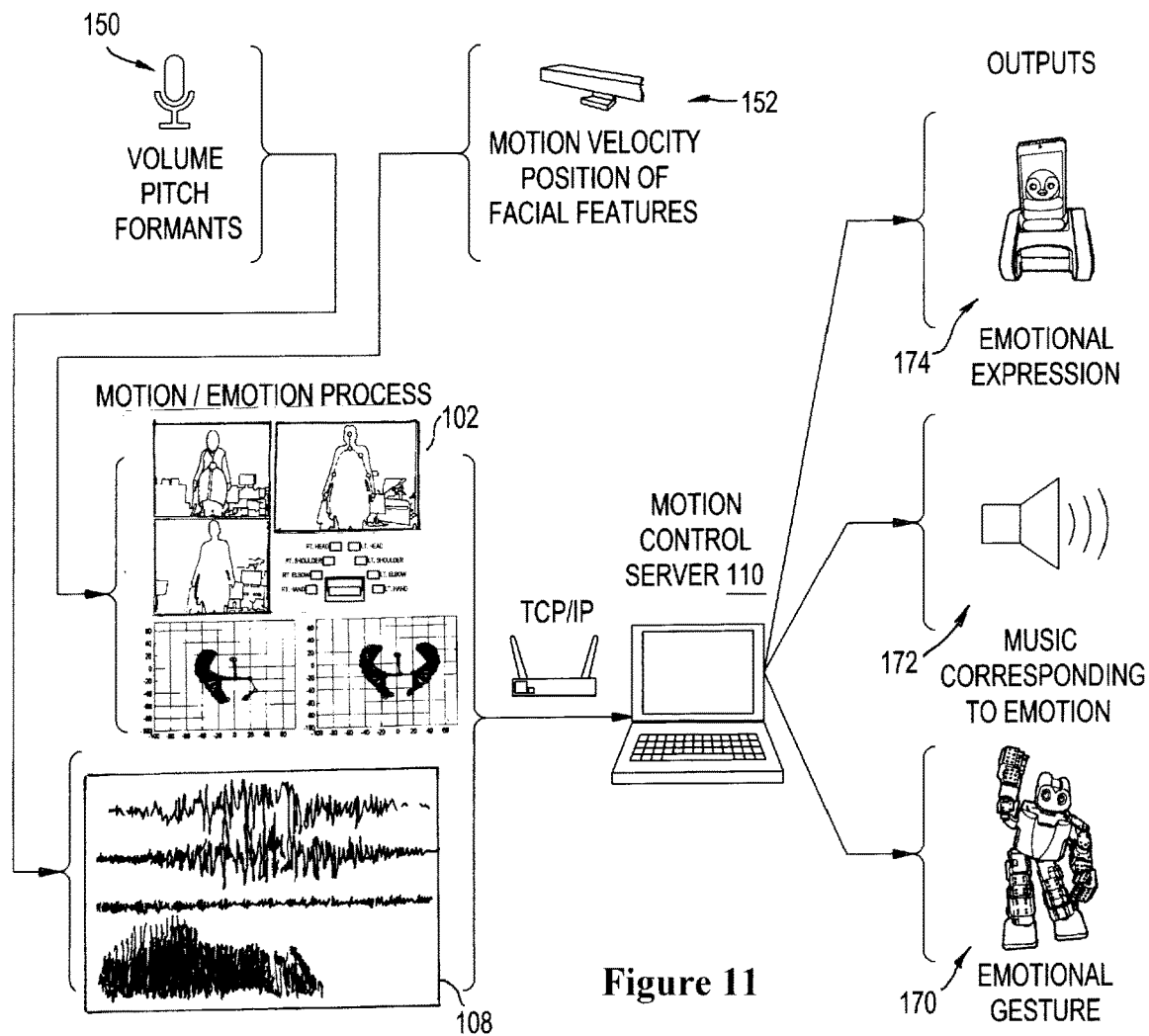
FIG. 11 is a flow chart showing metrics robotic system uses to determine the appropriate system response.

Turning to the drawings, FIGS. 1(a), 1(b), 11 show the human interaction system 100 of the present invention. The system 100 includes a controller 110, motion sensing module 102, engagement module 104, music analyzer 106, and vocal analyzer 108. The controller 110 can include a processing device 112 such as a server or the like, a Romo/ Darwin-OP 114, scenario controller 116, motion controller 118, and expression controller 119. As shown in FIG. 11, an audio input device 150 such as a microphone, can be connected to the motion control server 118. The microphone 150 receives audio input from the user (such as a child with autism or during a training process), and communicates that data to the server 118 by a wired or wireless link such as via TCP/IP.

Figure 10A:
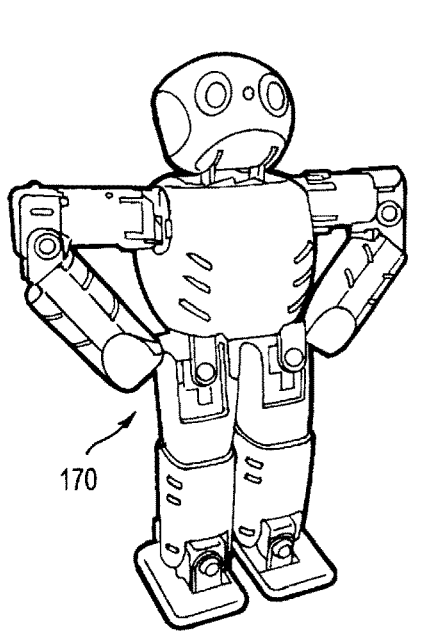
FIGS. 10(a)-10(c) show the robotic systems used in our interactive robotic therapy sessions: Robotis OP2 (FIG. 10(a)), Robotis Mini (FIG. 10(b)), and Romo (FIG. 10(c))
Figure 10B:
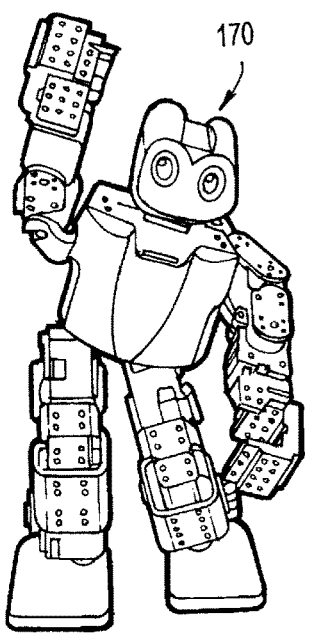
Figure 10C:
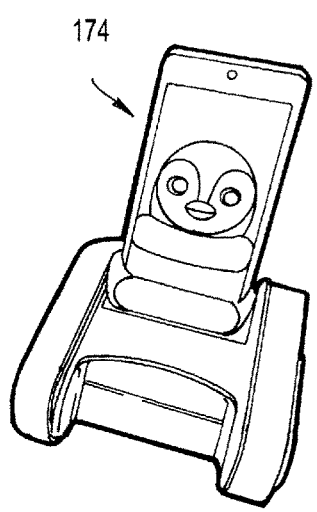

As further illustrated in FIG. 11, the system 100 has have various output medium. For example, in one embodiment of the invention shown in FIGS. 10(a), 10(b), the output can be a housing or body that is in the shape of a robot. As shown in FIG. 10(c), the system 100 output can also be implemented in a computing device such as a laptop, personal computer, or smartphone having a screen or monitor, and an input device such as a touchscreen or keyboard. The system 100 components communicate directly or indirectly with one another via wired or wireless link. The system 100 is used to provide an auditory treatment signal or robotic gestures and expressions for behavioral or emotional therapy, as outputs to a user. The auditory treatment signal can be, for example, an RAS signal to stimulate or treat a child with autism. The robotic gestures and emotions can be, for example, a robotic dance or smiling face to provide behavioral and emotional therapy to a child.

The robotic framework is composed of four functional modules for 1) robotic motion (118) and expression (119) controllers for robot motion generation for physio-musical stimulus, 2) human motion/emotion detection (102, 104) for estimating engagement, 3) music analyzer (106) for real-time musical feature extraction and robotic movement synchronization as well as vocal analyzer (108) for emotional cue detection through voice, and 4) robot intelligence module (Romo/Darwin-OP Controller 114, scenario controller 116, and server 110) for increasing engagement and interaction with activity and emotional interaction. Current investigation is focused on developing the framework for robotic motion generation for various emotional mapping, human motion detection system for observing engagement through physical responses, and audio analysis for real-time music analysis and emotional cue detection.

To effectively utilize RAS with a robotic system for human-robot interaction, the invention provides a framework composed of functional components for 1) music-based robot motion generation (by elements 106, 118, 119) for physio-musical stimulus, 2) human emotion detection for emotional engagement estimation (by element 102), 3) human motion detection for physical engagement estimation (element 102), and 4) robot intelligence module for increasing engagement and interaction with activity and emotional interaction (controller 110). In one example embodiment, the robotic motion generation and human motion detection effectively engages with children with ASD.

For interacting with children with ASD with the intention of having clinical effect on emotional and social interaction, the system needs to be able to detect emotional and social states of a child. Once perceived, it is imperative that the robotic system display appropriate expressive behaviors and stimulating motions (elements 118, 119 of controller 110) to engage in emotionally and socially based on the sensed emotional and social states of the child.

Human Motion Detection and Analysis

As popularly used, we use RGB-D depth sensors (e.g. Microsoft Kinect) to monitor the physical activities of a child to estimate the social engagement. To evaluate the participants' physical activities and social interaction, we will incorporate metrics from physical therapy and rehabilitation. For assessing the participants' gestures and small motions, we have determined from the literature that the best approach for our problem is to use the following metrics: range of motion (ROM), path length (PATH), peak angular velocity (PAV), movement time (MT), spatiotemporal variability (STV), and movement units (MUs).

Robotic Motion Generation

Figure 2:
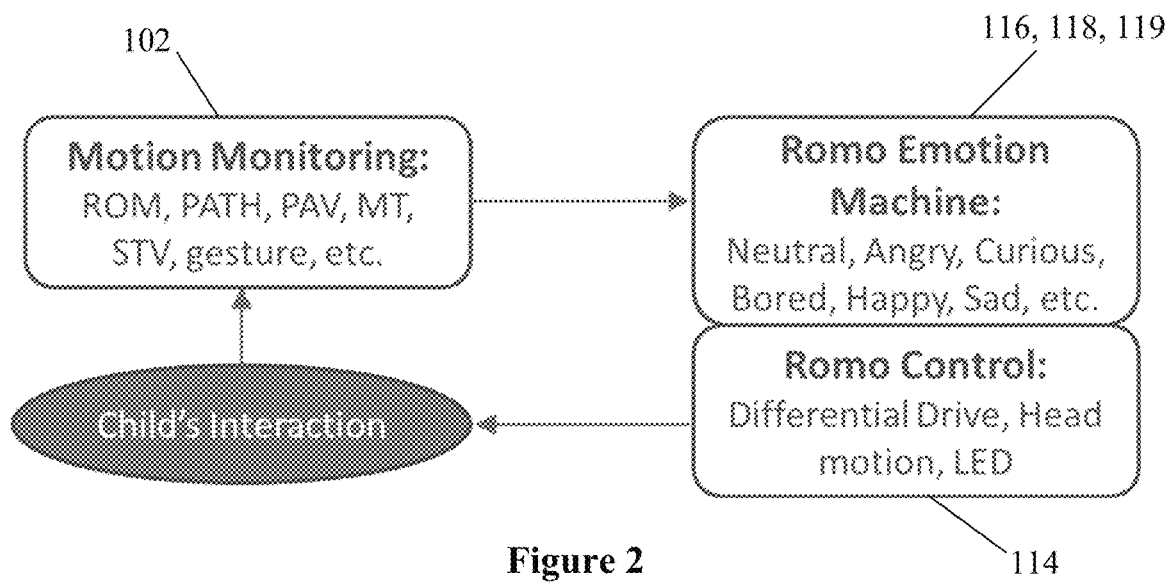
FIG. 2 is a robotic platform with emotional facial expressions.
Figure 7:
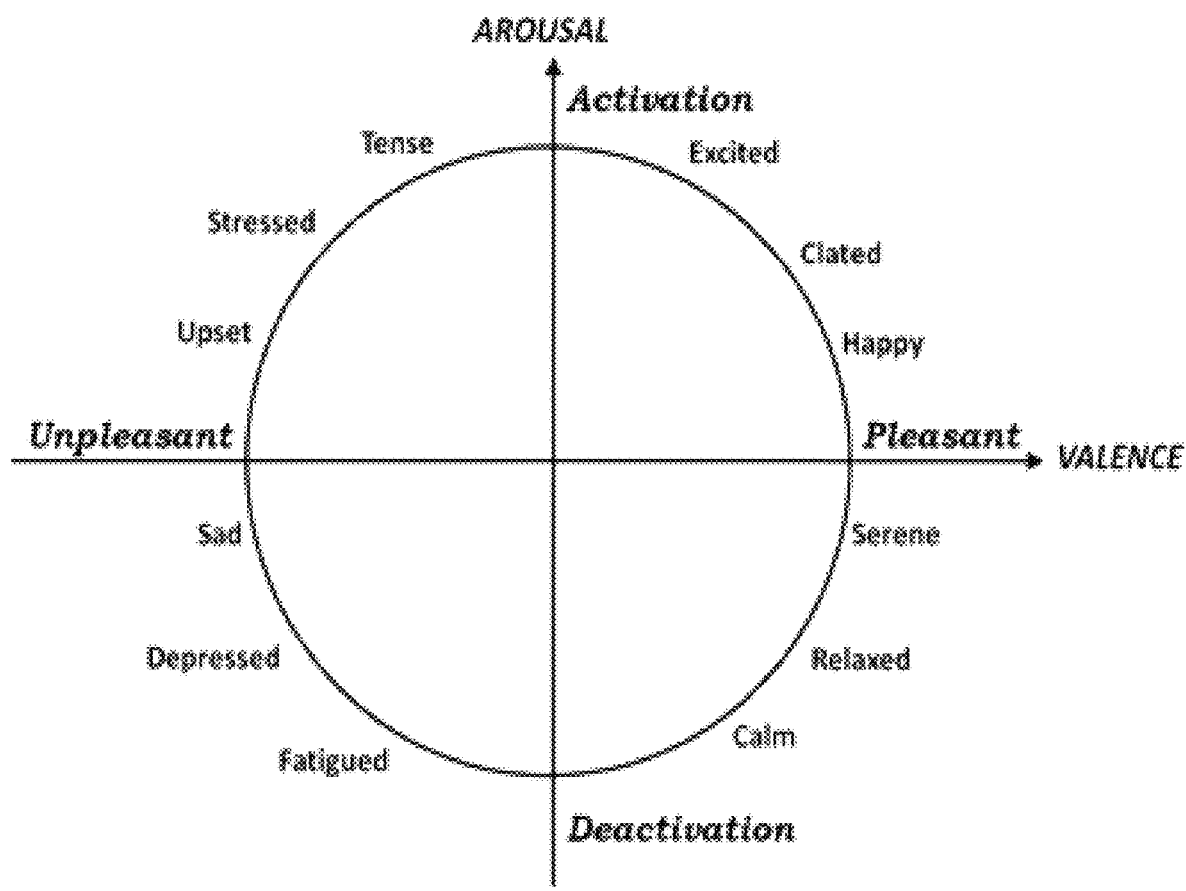
FIG. 7 is a version of Russell's Circumplex Model of Affect.
Figure 16:
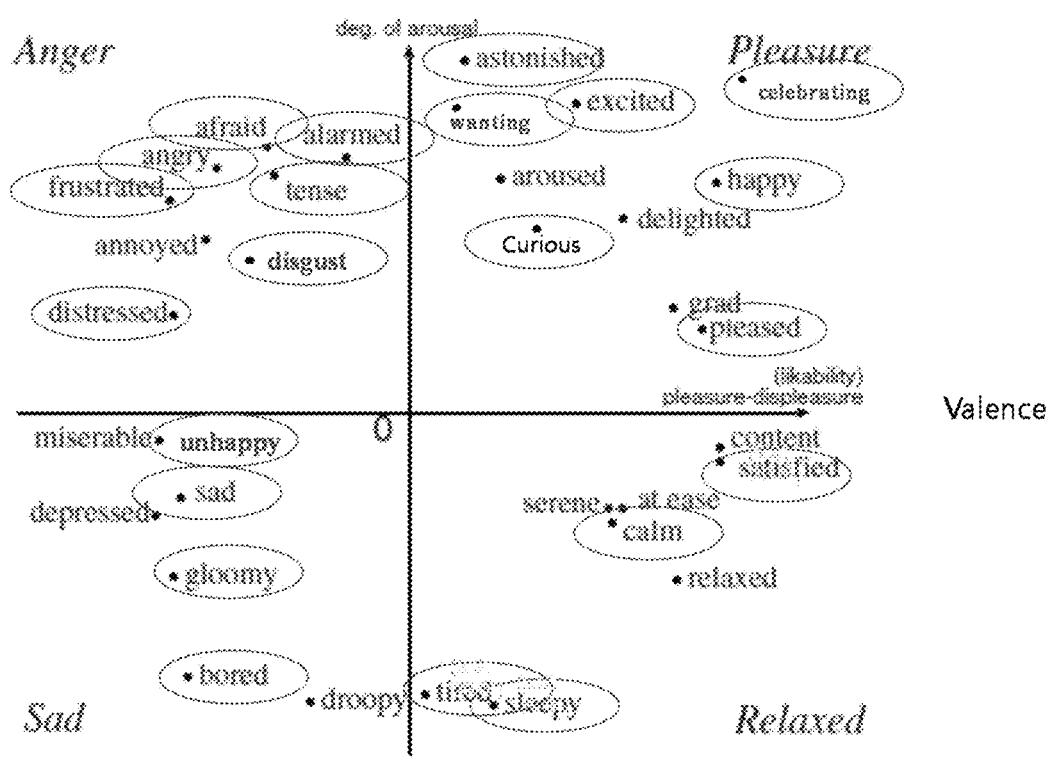
FIG. 16 is the emotional mapping of our agent (robotic) system based on Russell's circumplex model.

For a robotic platform, we will initially utilize a small robot from Romotive.com, called Romo1. However, any suitable robot or input/output device can be utilized. As depicted in FIG. 2, the robot is capable of displaying various emotions through facial expressions, sound, and motions, as shown in FIGS. 3, 4, 5, and 10. We utilize the sensory input from the motion monitoring and analysis module to regulate various parameters of the robot (e.g. speed, volume, and range of motion) toward more enhanced interaction with the child. Mapping between sound/musical signals and robotic motion/behaviors will be based on a simplified version of a two dimensional mapping of affect [9] (FIGS. 7, 16). Here, FIG. 2 corresponds to elements 102, 112, 114,116,118, and 119 of FIG. 1, and displays the data and control signals flow from the sensor 152 to the motion module 102 to the controller 110 to the output 174 in FIG. 11.

Interactive Robotic Sessions

To provide clinical effect on emotional and social interaction with children with ASD, the system detects emotional and social states of a child. In cases when the emotional states are not easily perceivable, we also incorporate motion analysis and vocal reaction sensing to indirectly estimate the level of engagement. Based on these perceptions of the states of the child, the robot will display appropriate expressive behaviors and stimulating motions to engage in emotionally and socially during game-based scenarios focused on senses or emotional behaviors [10].

Robotic Characters and Motions with Musical Themes

Figure 3:
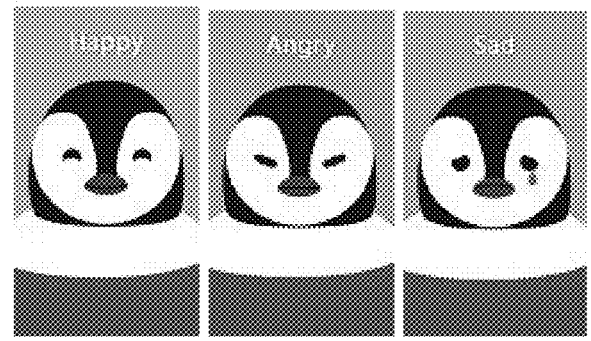
FIG. 3 is facial expressions with emotions (Robotic character with emotional expressions)
Figure 4:
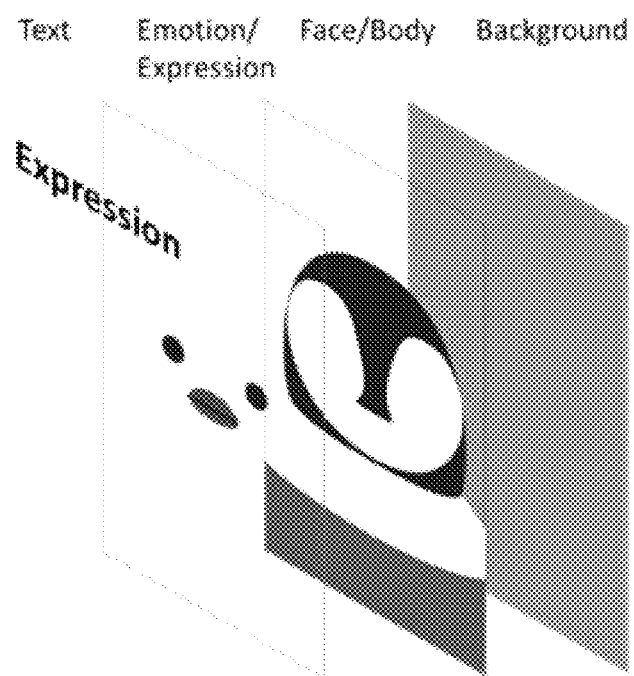
FIG. 4 shows the system's separate expression layers allow for independent adjustment of the expression and background color.
Figure 5:
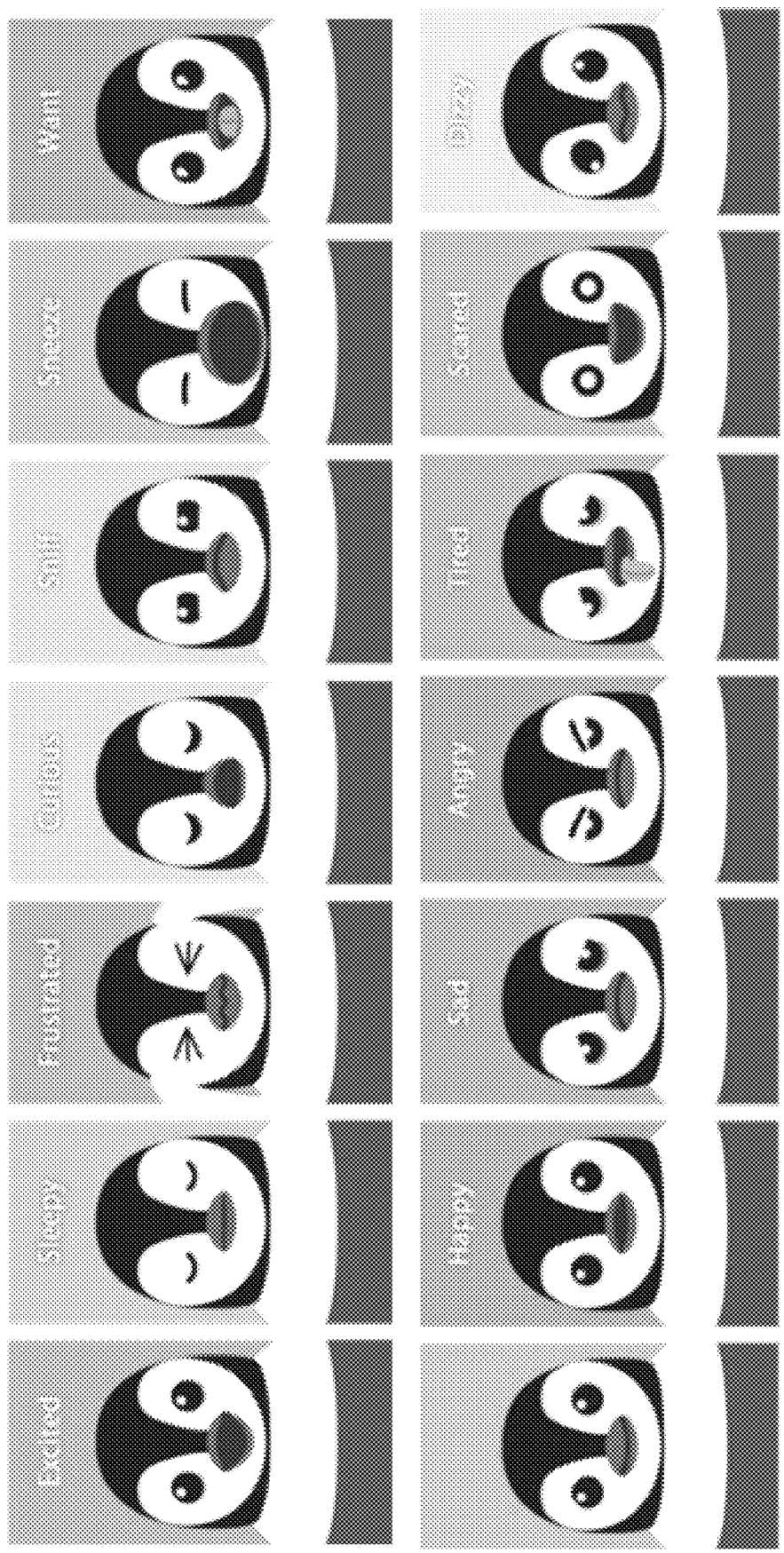
FIG. 5 shows the current emotions available for Romo. Darwin Mini expresses the same emotions through body language.
Figure 6:
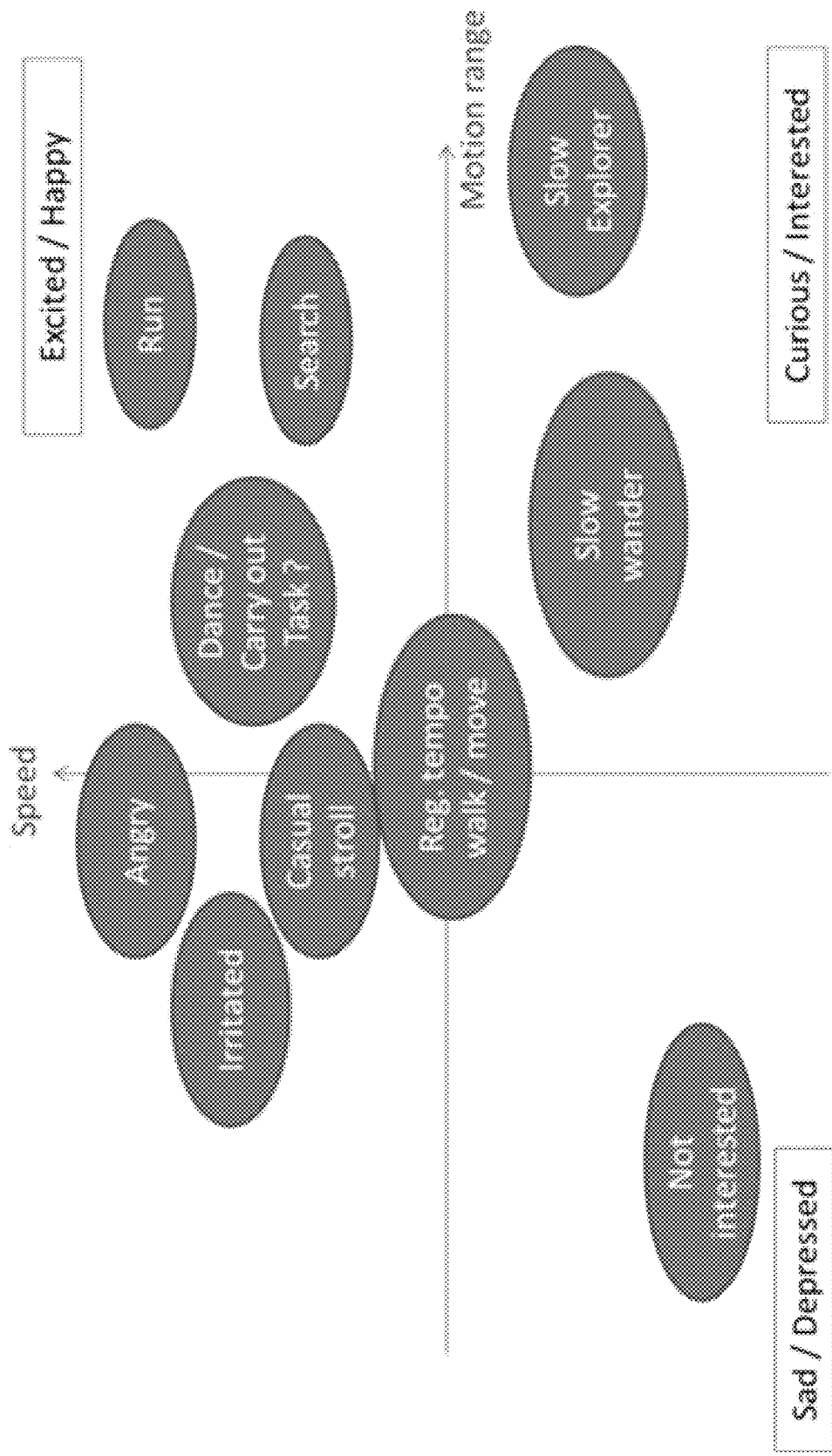
FIG. 6 is a spatial mapping of motion primitives with emotional mapping.

For a robotic platform, we will initially utilize a mobile robot (Romo from Romotive) and a humanoid (DARwin-OP from Robotis) 114. As depicted in FIGS. 3, 4, the robots include an expression output device (such as a monitor or display screen) that is capable of expressing diverse emotions and facial expressions, or performing physical motions. The motions will be autonomously selected and tuned based on various parameters we analyze from the motions of children and sound cues from music or the children (e.g. range of motion, speed, volume, beat, etc.) to increase engagement and interaction.

Two emotional output devices are provided as examples. The first is a modified Romotive, referred to hereinafter as Romo. Romo is an iPhone rover type robot which focuses on demonstrating emotion through facial expressions. The Romo character was modified from a bright blue monster to a baby penguin character, in order to be more appealing to children. Both Romo's expression and the background color can be changed to reflect the appropriate emotion. Children with autism often see colors at a higher intensity than neurotypical children. For this reason, all emotions are associated with pastel colors.

Darwin Mini, the second robot, is a humanoid that expresses emotions through body language. Each robot is currently programmed with the same fourteen emotions and actions, a sample of which can be seen in FIG. 5. To give our robots a full range of the emotional spectrum. In order to effectively use the robots to teach emotions, it is important a wide variety of emotions are displayed.

Our emotions were chosen based on Russell's Circumplex Model of Affect [9]. This model breaks emotions down into two axes: arousal, which refers to the energy level present with the emotion, and valence, which indicates whether the motion is a positive or negative experience. Between these two axes, all levels of emotion can be represented. Romo can express a limited degree of emotion by driving and tilting forward and backward. Darwin Mini is more adept in expression through movement. Each robot's mobility was taken into account. Along with Russell's Circumplex Model of Affect, each robot uses a variety of speeds and motion ranges to express emotion.

The present invention starts by engaging the child and robots in fun, demonstration-based behavioral sessions, to help the child learn to overcome sensory overload. Once the child has gained empathy for the robots, they will progress to interactive dance activities. The child's physical responses will be tracked by the Kinect. The child can mimic the robot, and the robot can track and mimic the child.

Tracking Emotional States via Body Language

Figure 8:
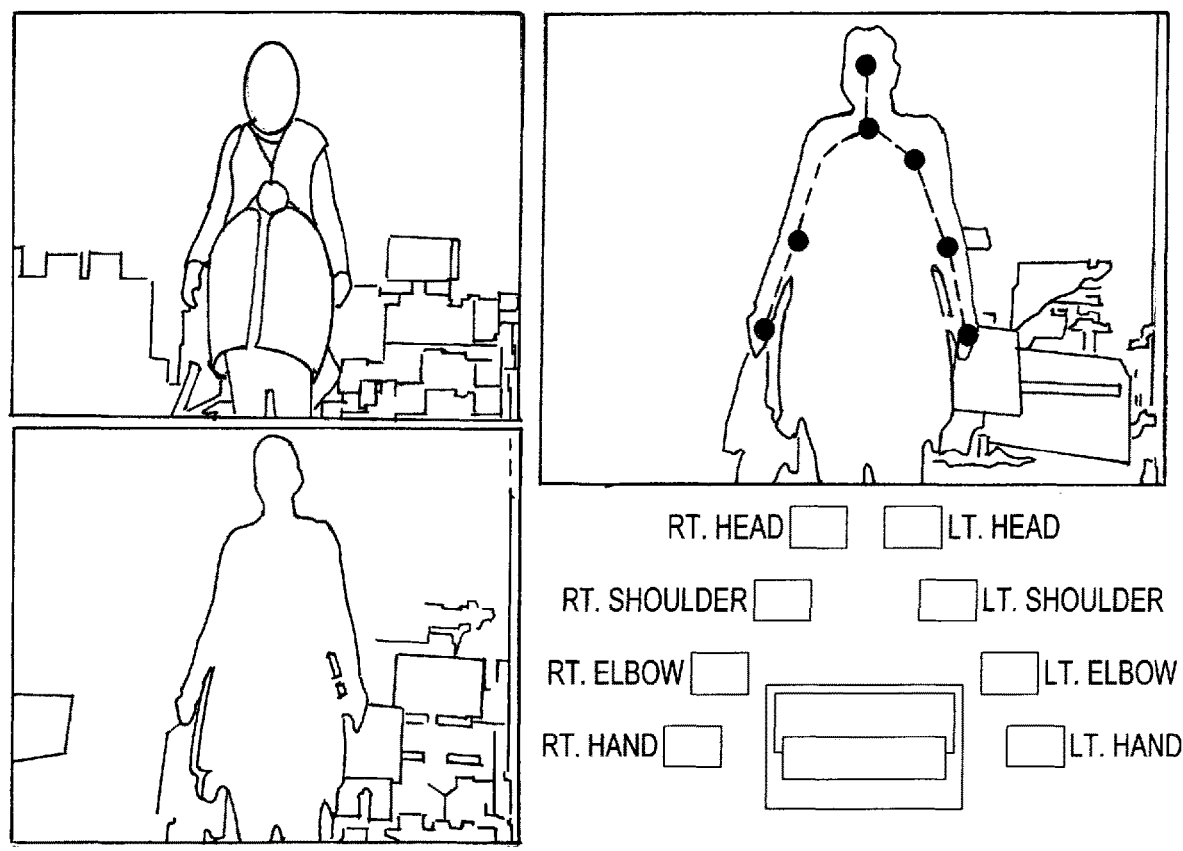
FIG. 8 is a graphic user interface of the Kinect system.
Figure 9:
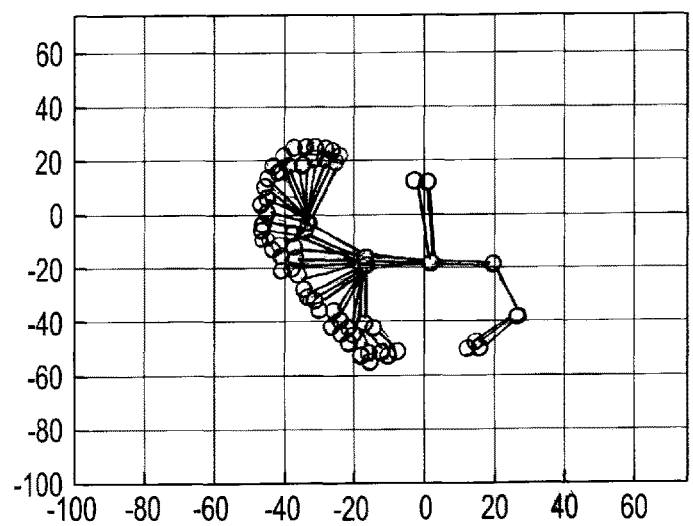
FIG. 9 shows captured trajectories of upper-torso movements.

The motion analyzer module 102 is connected to a motion detector or sensing device, such as the Microsoft Kinect, which is an RGB-D camera that can motion capture the changes in the dynamics at joints, tracking the positions of about 30 joints in a human subject. FIG. 8 depicts the user interface for the device and FIG. 9 depicts a sample movement sequence of joints. We utilize Microsoft Kinect as a tool to track the engagement of the children with the "social robots" employed, though any suitable system can be utilized. It is also used to provide live feedback within our robotic framework, to make Darwin and Romo more suitable to the children's emotions and desire. For instance, if the robots are too overbearing and the children start becoming anxious, that information (from elements 102 and 104 in FIG. 1) will be fed back into the robots' functionality controller server (elements 112, 114, 116, 118, and 119 in FIG. 1) using motion dense sequences tracked by Kinect (FIGS. 8, 9). The robots' functionality will "learn" and adjust accordingly, through adaptively changing the scenario controller 116 in FIG. 1, through the human-in-the-loop framework depicted in FIGS. 2, 11.

We calculate changes in motional features, such as velocity, acceleration, and torque, and partly draw on Laban Movement Analysis to understand the body language of subjects as they interact with the social robots. Basic emotion emotional states, such as anger, fear, disgust, surprise, happiness, sadness, tend to involve distinct expressions in body positions, which can be tracked by Kinect. Laban Movement Analysis (LMA) is one generally well-known method for categorizing and interpreting the differences in human movement, based on 4 categories: body, space, effort, and shape. Because of the practicality in quantifying motion via the effort category, in our paradigm we only take account of effort.

Effort is generally divided into four subcategories, which to some extent, can be quantitative for our purposes in analyzing emotions and relating to emotions: weight, space, time, and flow. Weight focuses on the amount of force exerted by the body (strong vs light). Space focuses on the attitude towards a movement pathway (direct vs indirect or flexible). Time focuses on how urgent a movement is (sudden or quick vs sustained) and can be measured by tracking acceleration. Flow focuses on how controlled/intentional a movement sequence is (bound vs free) and can be related to the amount of muscle contraction. A "strong, bound, quick, and direct" movement is known as of "fighting form" while a "weak, free, sustained, and inflexible" movement is known as of "indulging form."

Initially, we will involve measure weight and time factors, as those are the most practical and feasible parameters for which quantitative information about movement can be attained. Additionally, we will also create a third parameter, "motion unit" parameter to quantify the number of continuous movements a subject does before pausing. For instance, if an arm is moved back and forth five times in one single time span with no pause in the arm movement, it would be measured as "one motion unit;" if on the other hand, there was five pauses between the movement back and forth, it would be measured as "five motion units."

Time and weight features can be calculated by quantifying the kinematic features of the joints Kinect tracks. As shown by Table 1 below, both high acceleration and high velocity of joint movement both indicate that a movement is sudden, whereas low acceleration and low velocity indicate that a movement is sustained. Table 1 shows the correspondences between LMA parameters and physical entities [12]. Knowing whether an action is indirect vs direct, for instance, can give us information about the inner attitude towards a particular movement. If it is direct, we could say that the subject showed confidence towards that movement. Curvature can be approximated by finding the change of the displacement angles (angular velocity).

TABLE 1

| LMA parameter | Physical entities |
| --- | --- |
| Space | Displacement angle |
| Time.sudden | High acceleration, high velocity |
| Time.sustained | Low acceleration, low velocity |
| Space.direct | Small curvature, high angular vel. |
| Space.indirect | High curvature, high angular vel. |
| Weight.strong | Muscle tension, medium accel. |
| Weight.light | Muscle relaxed |

A number of rising studies indicate strong correlations between kinematic features, including LMA features, and emotional states. In one study [13], ten people were put in one room hearing "pleasant sounds" and ten others in another room hearing "unpleasant sounds." Researchers rated the persons' emotional states after hearing the sounds & their movements were recorded by video cameras while in the room. Laban Movement Analysis was carried out on their movements and indicated that unpleasant sounds induced active, directed, and sudden movements, that were thus part of "fighting form" whereas pleasant sounds induced unsteady, weak movements leaning towards "indulging form" [13]. It was also revealed that tension, depression, fatigue, and confusion related to active, directed, and sudden movements while fatigue was exhibited in particular in strong and rapid movements. Moreover, the unpleasant sounds induced tension, and increasing tension coincided with an increase in the time feature. This makes sense given that time measures the degree of hurriedness in movement changes and more hurriedness in general is a sign of greater tension. Findings such as these support the strength and validity of Laban Movement Analysis as a quantitative tool for measuring body language features in order to relate to emotional states.

Calculated Parameters

Numerous studies have established variations of equations to quantify the LMA parameters used. The present invention utilizes the time and weight LMA parameters. It also utilizes the concept of a "motion unit" to quantify a certain movement.

Weight Term

Part of LMA effort classifiers, the weight term gives an indication of the strength or force of movement exerted by body for a particular movement sequence. A weight term can be light or strong. One approach to calculate the weight term is to do a weighted sum of all the joints torques'. The two variables that are intrinsically dependent on the subject are radius and mass of the joint.

Equation A [15] is as follows, where i is an arbitrary joint. In general, the equation for weight term can be described by: Weight per frame/second=($\Sigma$torque$_i$)/# joints=($\Sigma$(riFi sin(theta$_i$)))/# joints.

Time Term

Another effort classifier, the time term helps distinguish between movements which are sustained versus those that are sudden. Therefore, the time term can represent the speeds of a particular movement sequence and the speeds' changes over time and can be useful, as an example, for identifying meditation and concentration states (sustained states) versus frustration and excitement states (sudden states).

Equation A [14] is based on assessing changes in acceleration and is represented as follows: Time term per frame/second=abs(($\Sigma$derivative of acceleration)$_i$)/# joints. Equation B [15] is another approach, as follows: Time term per frame/second=(($\Sigma$(angular velocity)$_i$)/# joints.

Motion Unit

While a "motion unit" is not particularly a LMA feature, it is also useful in characterizing motion sequences like the other features. A motion unit can be said to be a pause in a whole-body movement. We can say that a motion unit is analogous to a minimum in the movement's acceleration feature, or an instance when the absolute velocity of the movement is approximately zero. The absolute velocity will not be exactly zero though due to noise, so an approximate threshold will be determined based on trial. One approach is therefore to subjectively assess a few motions for the number of motion units that can be observed with the eye and use Kinect at the same to provide data for plotting the acceleration for that movement sequence and track the minimums and correlate with the number of observable motion units. Then, an approximate velocity threshold for when a new motion unit occurs can be garnered.

Inclination

We measure the inclination of human body to estimate the engagement level, which relates to the valence. The equations are as follows:

Inclination (Forward/backward leaning)
Found by taking the average over the time of enactment
Average distance between shoulders and hips
$COG_s(t) - COG_h(t)$
$COG_s$=Shoulder center of gravity
$COG_h$=Hip center of gravity Area of Movement We also measure the area of movement to estimate the activation. The relation is not always directly proportional, so we measure these values, collect actual human data during emotional gesture performances, and analyze the data to train our model using complex trees, etc.

Area (Total area taken up by subject during enactment)
Range of total area taken up by quadrangle created by hands/shoulders
Otherwise expressed as the maximum area taken up by the person during expression $$MAX_{Area} - MIN_{Area}$$

$$Area = 0.5(\vec{a} \times \vec{d}) \times \sin(\theta_1) + 0.5(\vec{b} \times \vec{c}) \times \sin(\theta_2)$$

$$\theta_1 = \tan^{-1}\left(\frac{Y_{RS} - Y_{RH}}{X_{RS} - X_{RH}}\right) + \tan^{-1}\left(\frac{Y_{LH} - Y_{RH}}{X_{LH} - X_{RH}}\right)$$

$$\theta_2 = \tan^{-1}\left(\frac{Y_{RS} - Y_{LS}}{X_{RS} - X_{LS}}\right) + \tan^{-1}\left(\frac{Y_{LH} - Y_{LS}}{X_{LH} - X_{RS}}\right)$$

$$\vec{a} = RH \to RS$$

$$\vec{b} = RS \to LS$$

$$\vec{c} = LS \to LH$$

$$\vec{d} = LH \to RH$$

$X_{RH} = x$ coordinate of right hand $Y_{RH} = y$ coordinate of right hand

All the above movement parameters are analyzed for the actual human motion datasets we collect during emotional performance sessions, and the trained result is implemented in our system.

Emotion Sensing from Voice

For this purpose, the present invention [16, 17] provides interactive robotics to engage in emotional and social interactions with children with ASD. Our interactive robotic framework consists of two types of robotic systems: a humanoid robot (Robotis Mini) with the capability of gesture representations and an iOS-based mobile robot (Romo) capable of conveying emotion through facial expressions and voice. The humanoid robot displays dynamically varied body movements and gestures, while the mobile robot displays facial cues corresponding to specific emotions, as shown in FIG. 10. Using these two robots together allows for easy singling-out and articulation of emotions to autistic children. This reduces the complexity of human emotional expressions, in which multiple emotional cues can be coexisting, while our robotic framework can simplify the channel for emotional interaction. A human's body movements, when coupled with contradicting facial cues, can often complicate a child with ASD's ability to distinguish the intended emotion and lead to sensory overloads.

The present invention robots interact with children using pre-programmed scenarios, gestures, or games, as well as emotions the child is expressing while interacting with the robot. For example, if a child is crying during the session with the either robot, the robot should appear to be aware and change the way it is interacting in order to comfort the child. This is where automatic emotion classification through audio and speech analysis becomes important to the robotic system. Moreover, this robotic system aims to integrate music into the learning environment in hopes of observing if and how music could further help children in relating body movements and gestures to specific emotions.

Automatic Emotion Classification

The ultimate goal of the present invention is to integrate an automatic emotion classifier with a robot for interactions with children in autistic spectrum. As an initial step to achieve the goal, we focus on constructing an automatic emotion classifier.

Database

The present invention utilizes the Interactive Emotional Dyadic Motion Capture (IEMOCAP) database to extract emotional speech features to train an emotion classifier. The database was collected from 10 subjects (five males and five females), and two subjects form a pair for dyadic conversions. Each pair performed about 30 recording sessions which last about five minutes each. The five conversation pairs performed 71 scripted sessions and 80 spontaneous sessions in total. The total duration of recorded sessions is about 12 hours, and the audio sampling rate of the corpus is 16 kHz [18].

The dialogues were segmented at the turn level. In total the database contains 10039 turns with an average duration of 4.5 seconds, and the average number of words per turn is 11.4. Loosely speaking, the turn-level segmentation can be also viewed as the utterance level segmentation, where the speaker utters a thought or idea. The average duration of words in the database is about 400 ms; this gives the average speaking rate of the subjects 150 words-per-minute, which is also the average rate for English speakers in general.

The turn-level segments of the data were annotated with two different approaches, namely categorical and dimensional annotations. Three human evaluators (researchers in the experiment, the parents, or clinicians) annotated categorical emotions as neutral state, happiness, sadness, anger, surprise, fear, disgust, frustration, and excitement. Dimensions of valence (pleasure), activation (arousal), and dominance were scaled from 1 to 5 by three human evaluators. The authors of the database employed the self-assessment manikin (SAM) to evaluate the corpus in emotional dimensions. The emotional dimensions were evaluated from 1 (negative) to 5 (positive) for valence (e.g., pleasure); 1 (low) to 5 (high) for activation (e.g., arousal); and 1 (weak) to 5 (strong) for dominance.

The present invention measures human emotional responses in terms of activation and valence (2-dimensional emotional domain) and generate emotional robotic gestures for social and emotional interaction. Thus, the emotional dimension can be a mathematical representation or quantification of a person's emotional condition or state. The emotional dimension can be associated with an emotional dimension label (also referred to as an emotional state or just state), and each emotional dimensional label or state can be assigned an emotional dimension level. That is, as suggested in [19], the five levels of the emotional dimensions are grouped into three due to the sparsity of data in the extremes of the scale range. The first level contains ratings in the range (1, 2), the second level contains ratings in the range (2, 4), and the third level contains ratings in the range (4, 5).

Speech Feature Extraction and Projection

One of the most popular speech feature extraction toolkits is openSMILE [20]. The openSMILE has been used by many speech researchers, especially for emotion classification in speech. The openSMILE toolkit extracts up to 6,373 acoustic features from speech signals. The openSMILE feature extractor provides energy, spectral, and voicing-related low-level descriptors, along with their statistical and regression measures [20] and we run openSMILE based feature extraction tools in 106.

It was reported that a multi-temporal analysis approach would improve the emotion classification accuracy [21]. However, one of our primary goals in this paper is to implement the automatic emotion classification in real time, and the computational coast of the multi-temporal approach would be burdensome for the real-time implementation. In the work of [21], the phrase-level emotion classification shows the highest performance rate; however, the phrase-level analysis would delay outputting the classification results, and it would not be near real-time processing. It is important to analyze the emotion in near real-time, such that a robot can react/respond in a spontaneous manner. As shown in [21], the performance rate of the 800 ms analysis approach is slightly below the phase-level approach, it was chosen in this work. Since the average the average speaking rate of English speakers is 150 words-per-minute in general, the 800-ms approach corresponds to analyzing two words per window [21].

In general, a larger number of features does not always result in better classification. It is important to reduce the dimensionality of the feature set to provide a reduced feature set, not only to speed up the classification process, but also to optimize classification performance. Feature projection algorithms are often employed for this reason. Feature projection algorithms use statistical methods to reduce the dimension of the features by applying linear transformation. One popular feature projection algorithm is principal components analysis (PCA). PCA finds the optimal orthogonal linear transformation matrix that preserves the subspace with the largest variance without paying any particular attention to the underlying class structure.

To obtain the optimal number of the principal components, we increase the number of the components by 10 each iteration. For each iteration, SVMs were employed to calculate unweighted accuracy (UWA) over 10 subjects using a leave-one-out cross-validation (LOOCV) technique. The averaged unweighted accuracy (UWA) was measured as defined in Eq. (1).

$$UWA = \frac{1}{M}\sum_{m=1}^{M} \frac{\# \text{ of hits in class } m}{\# \text{ of instances in class } m}, \quad (1)$$

where M is the number classes. The level of chance in classifying M classes is 1/M, and in our case of classifying the three levels of emotional states, the level of chance is ⅓.

The choice of the kernel function of SVMs is important in both the classification performance and the computational cost. Since the size of the IEMOCAP dataset is quite large both in the feature dimension and the number of instances, a linear kernel method was chosen as suggested in [22].

Figure 12:
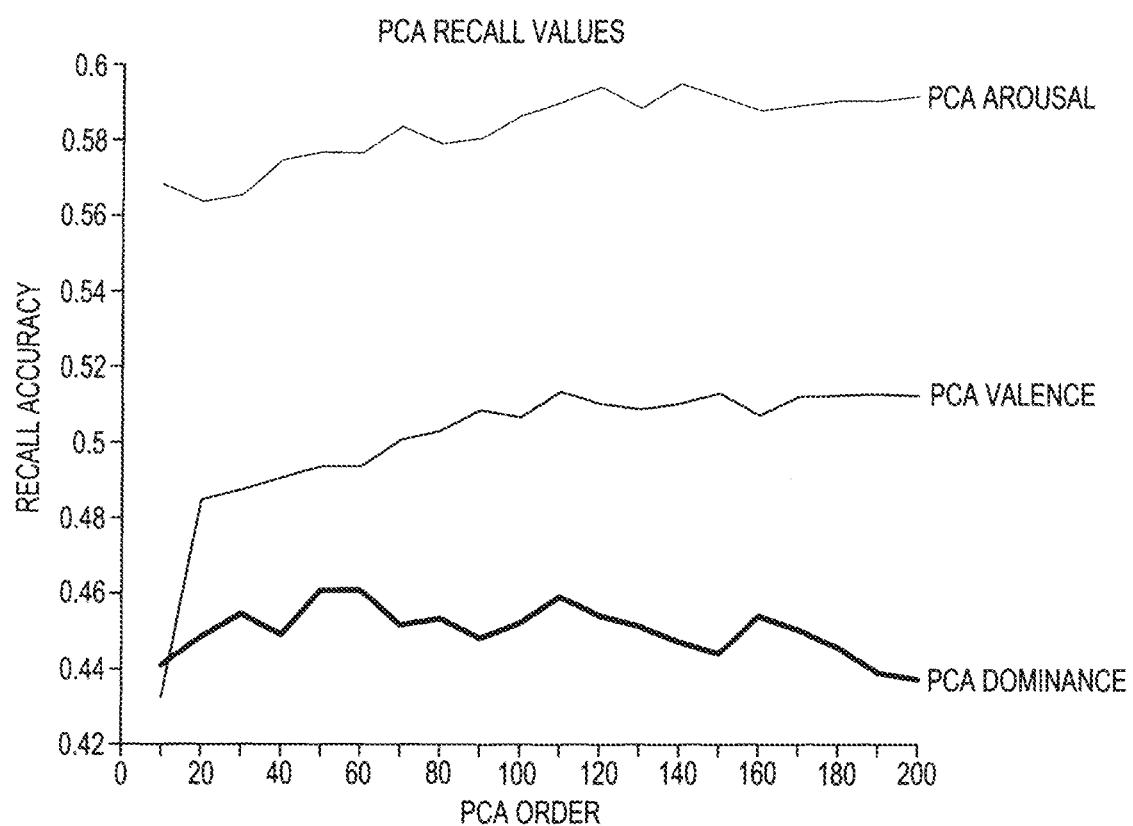
FIG. 12 is a plot that shows UWA of PCA when the number of components are swept from 10 to 200 components.

The results of sweeping the number of principal components from 10 to 200 are shown in FIG. 12. For classifying the levels of arousal and valence, FIG. 12 shows trends of increases in UWA as the number of components increases. In the case of dominance, a certain or pattern is not observed. It is known that classifying the levels of dominance is relatively difficult than the other two dimensions, and the speech acoustic features may not be the best for modeling the levels of dominance. Similar results in classifying the level of dominance are reported by others [2]. Despite the importance of dominance dimension, due to its unpromising results, no further analysis in dominance dimension is carried out here.

As shown in FIG. 12, it is suggested to use a large number of principal components; however, the trade-off is between the computational cost and subtle increases in accuracy rate. After around 150 principal components, the increases in the accuracy is very subtle. Throughout the rest of this paper, 150 principal components are used.

Real-Time Implementation

Speaker Normalization

Since the recording environment and channel conditions of the IEMOCAP data are different from the real-world data collecting conditions, a novel normalization method is discussed in this section. In previous work, a general speaker normalization method has been employed to resolve the expressivity variations across the speakers [19, 21, 23]. However a problem with the speaker normalization is its assumption on the data distribution of the emotional states of each speaker. The assumption is that the data of each speaker has a similar distribution over the emotional states. For example, if the dataset of a particular person has significantly more "highly" aroused data than other speakers, such a speaker normalization method will be biased, and the classifier of the person will degrade. To overcome the issue, we propose a speaker normalization method, wherein only a few samples from the neutral emotional state of each speaker are used for normalization. This approach can be considered as a "configuration stage." The hypothesis is that if a machine learning algorithm knows what a person sounds like when the person is in a "neutral" state, and the data (features) are normalized in such a manner, the machine learning algorithm's prediction would improve. This process results in a "configuration feature set." This method does not assume data distribution properties, but requires a configuration stage for a new speaker. The method is performed by the following steps:

1. Extract speech features from speech data
2. Perform PCA for feature dimension reduction.
3. Randomly select a subset of samples from the neutral state of each speaker.
4. For each speaker, calculate the means and the variances of the selected data in the reduced feature dimensions.
5. For each speaker, subtract the means then divide the variances from all the data of the speaker.
6. Train the classifier.
7. Set the "configuration feature set".

When running the classifier with a new speaker, the steps 1-5 are performed in the same manner. To do so, a few samples of neutral state from the speaker must be collected. Now, the question is how many samples are sufficient. Using the IEMOCAP dataset, we increased the size of the data for normalization from 1 min to 10 mins. The results are shown in FIGS. 13(a) and 13(b).

Figure 13A:
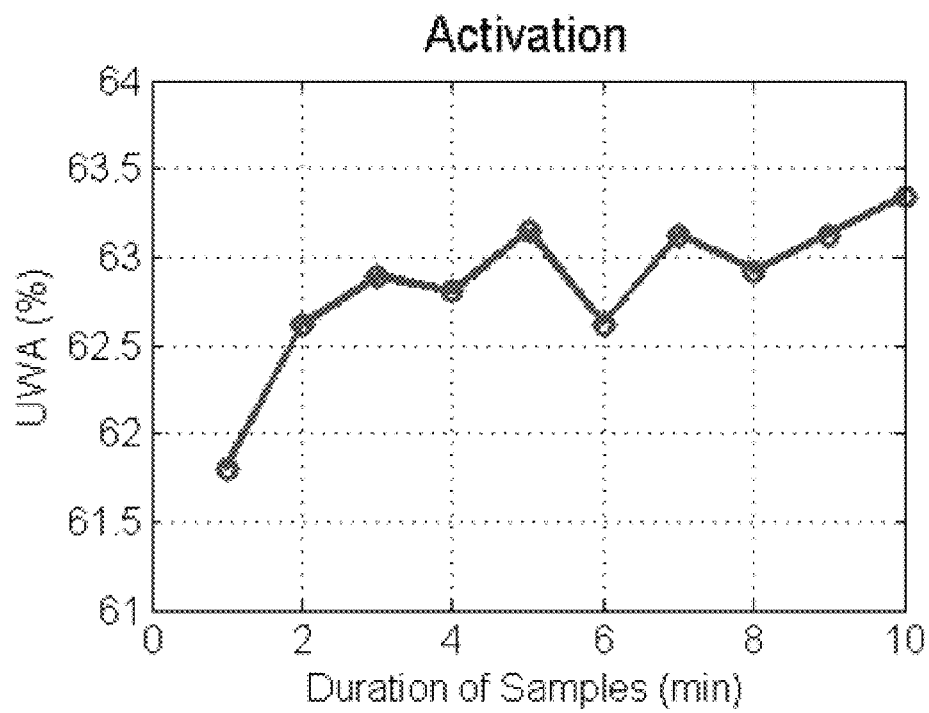
FIGS. 13(a) and 13(b) are plots showing unweighted accuracies (UWA) when the duration of samples for normalization increases from 1 min to 10 mins for Activation (FIG. 13(a)) and Valence (FIG. 13(b))
Figure 13B:
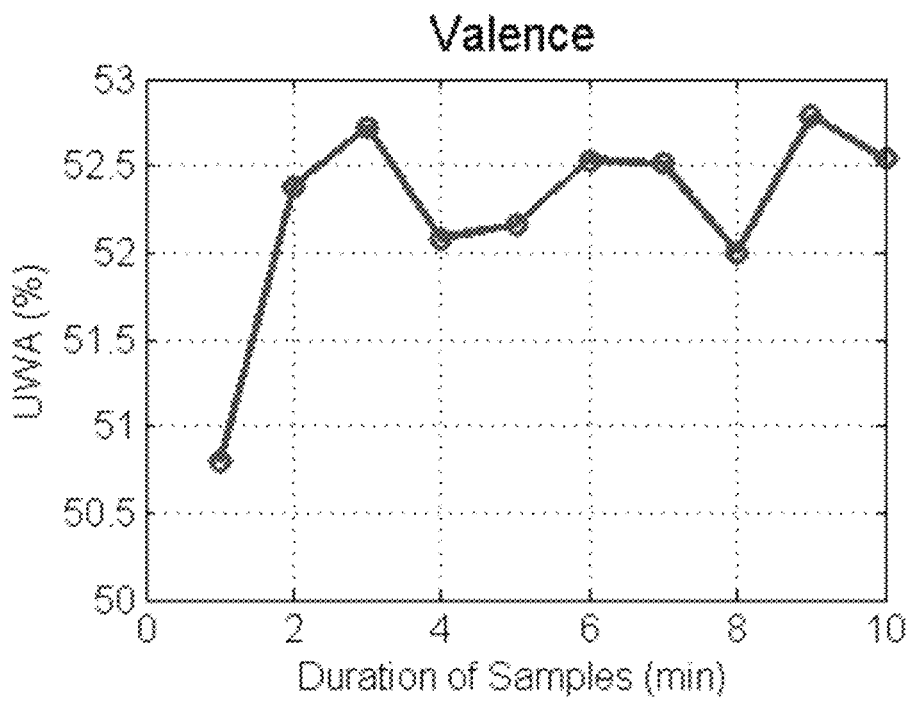

As shown in FIGS. 13(a), 13(b), trends of increases in the performance rate as the size of randomly selected samples increases in classification of activation and valence. Although a certain trend or pattern is not clearly observed in classifying the levels of dominance, the present invention is advantageous. It is known that classifying the levels of dominance is relatively difficult than the other two dimensions, and the speech acoustic features may not be the best for modeling the levels of dominance.

Using the general speaker normalization with an 800 ms analysis window, the reported UWAs for classifying the three levels of activation and valence are 59.7% and 51.2%, respectively [21]. As expected, the present invention outperforms the general speaker normalization method. By normalizing data for each speaker using 3 mins of neutral data, the UWA is 62.9% and 52.7% for activation and valence, respectively.

To test whether or not this improvement is statistically significant, a paired t-test was performed. For classifying the three levels of activation, the present invention improved the UWA by 3.2 percentage points with a p-value less than 0.01. For classifying the levels of valence, the present invention improved the UWA by 1.5 percentages points with a p-value less than 0.05. Since the p-values are less than 0.05 for both the cases, the improvement is statistically significant.

Table 2 shows the UWA for each speaker when the duration of the randomly selected samples for normalization is 3 mins. The emotion classification accuracies are noticeably higher with female over male subjects. Much psychology and sociology literature reports that women are more emotionally expressive than men. The findings in the emotion classification difference between the genders do not attempt to confirm their studies on expressivity; rather the current findings are supported by them.

As reported in previous works, the confusion matrices of the present invention in Tables 3 and 4 show that the classification task is relatively easier in the opposite extremes than in the midrange emotions. The results are again based on the present invention, where the duration of randomly selected samples is 3 mins.

Each row of the confusion matrices represents the instances in an actual class normalized by the total number of the instances, and each column represents the normalized instance in a predicted class. The opposite extremes are infrequently confused with each other.

Table 2 shows the unweighted accuracies (UWA) for classifying the levels of activation and valence, when 3 mins of neutral state data are used for normalization.

TABLE 2

| Speaker (gender) | Activation UWA | Valence UWA |
|---|---|---|
| 1 (F) | 67.2 | 48.3 |
| 2 (M) | 63.1 | 54.5 |
| 3 (F) | 68.0 | 48.2 |
| 4 (M) | 62.1 | 46.9 |
| 5 (F) | 63.1 | 58.5 |
| 6 (M) | 57.0 | 49.2 |
| 7 (F) | 65.4 | 59.1 |
| 8 (M) | 62.3 | 51.2 |
| 9 (F) | 63.0 | 53.2 |
| 10 (M) | 62.2 | 56.5 |
| Overall | 62.9 | 52.7 |

Table 3 is a confusion matrix for classifying the three levels of valence.

TABLE 3

| | Neg' | Neu' | Pos' |
|---|---|---|---|
| Neg | 48.5 | 34.8 | 16.7 |
| Neu | 14.6 | 63.5 | 21.9 |
| Pos | 18.0 | 36.0 | 46.0 |

Table 4 is a confusion matrix for classifying the three levels of activation.

TABLE 4

| | Low' | Med' | High' |
|---|---|---|---|
| Low | 73.9 | 20.8 | 5.3 |
| Med | 29.1 | 30.9 | 40.0 |
| High | 4.9 | 9.5 | 85.6 |

Real-Time Emotion Classification

Figure 14:
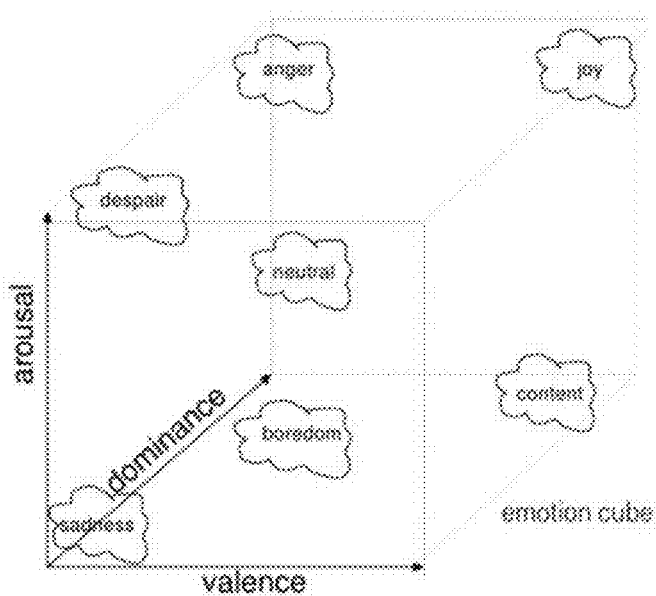
FIG. 14 is a map of emotions from PDA dimensions.

Based on the PAD emotional state model, all emotions can be represented using the dimensions of pleasure (valence), arousal (activation), and dominance. Therefore, three SVMs were created. This way each SVM would determine the level of expression for its own specific dimension it was trained on. By separating and analyzing the emotions by their PAD dimensions instead of predicting emotions as a single unit, accuracies for each SVM could be assessed in order to increase prediction accuracies individually. The data would then be mapped using the three PAD dimensions in order to determine the emotion being expressed. An example of the mapping is shown in FIG. 14.

Figure 15:
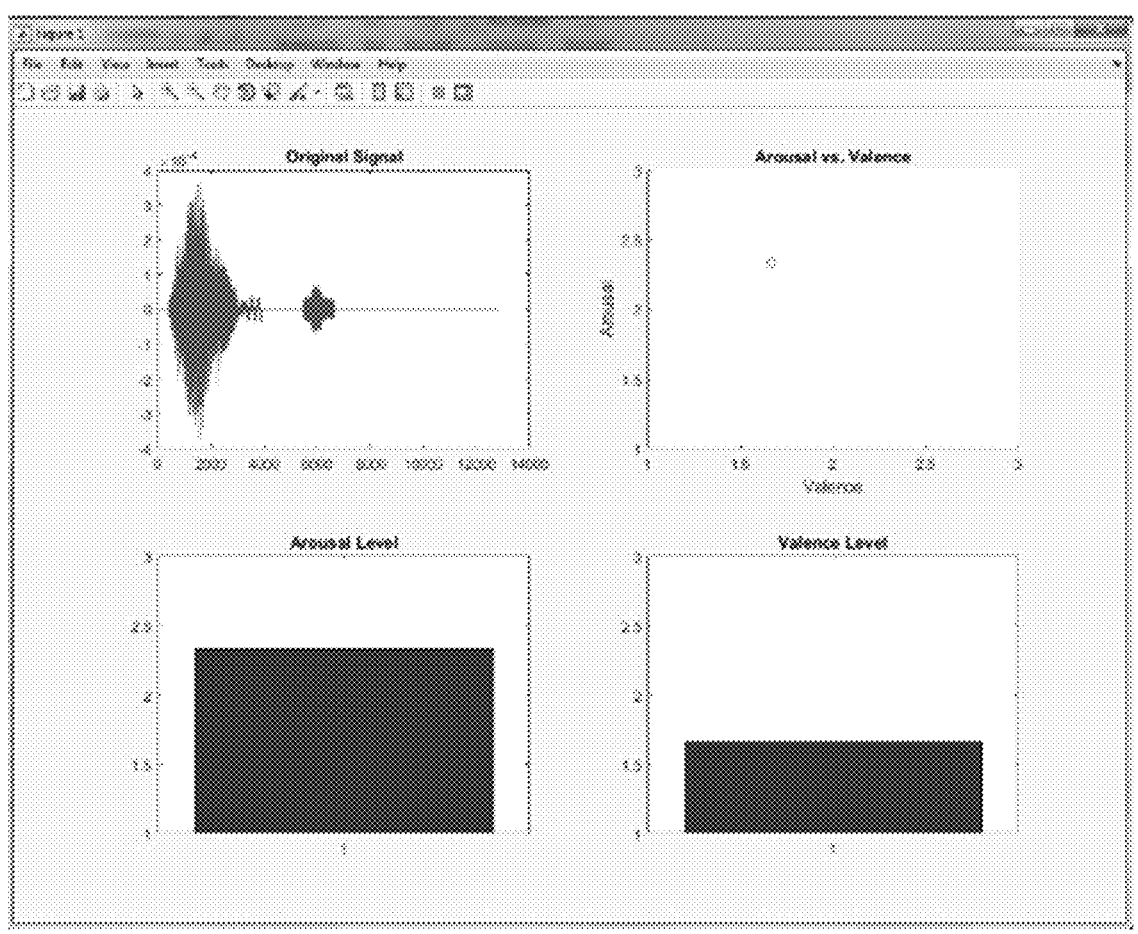
FIG. 15 is a graphical output of audio analysis.

Using the MATLAB DSP Toolkit, the emotional classification program is able to read in live audio signals. The speech signal is continuously read and stored in an 800 ms buffer. The data in this buffer is then sent into the openSmile Toolkit in order to extract acoustic (e.g., music) and prosodic (e.g., voice) features from it. Since the SVMs have been previously created, the classification program only needs to send in its extracted feature data into each of the three SVMs in order to get expression levels for valence, arousal, and dominance. These levels are measured from one to three; one being low; two being neutral; three being high. A three-point averaging filter is then implemented for each dimension so that the prediction values don't get influenced too heavily if a single 800 ms frame acts as an outlier to the other two frames in the filter. Implementing the filter also allows for a smoother transition of predicted emotions. The original speech signal, predicted arousal and valence levels, and emotion mapping are displayed in a MATLAB GUI and updated every 800 ms. The GUI is shown in FIG. 15. Dominance is not yet shown on in the GUI due to its low prediction accuracy.

Emotional Interaction Control Algorithm

Consensus-Based Emotional Interaction Model

While previous studies focused more on expressing artificial emotions through robotic systems, estimating emotional responses of humans, or assessing engagement in task-based settings, realistic model for emotional interaction has not shown much progress. The present invention provides a novel theoretical framework for emotional interaction by incorporating consensus theory on emotional engagements. Our model includes three emotional agents: human emotion, robotic emotion, and a target emotional goal for emotional regulation and therapy.

Our emotional domain is based on the 2-dimensional (2D) mapping of emotions with arousal (A) and valence (V) based on Russell's circumplex model [9]. In this 2D plot (FIG. 16), we can then represent a person's emotional status as xH and a robotic agent's emotional status as xR. By adding an emotional regulation goal of xG, we can then form a consensus equation as in (1): ((B( ): character bias function, aR: approach rate))

$$\dot{x}_R = B\left(a_R \sum_j (x_j - x_R)\right)$$

The consensus approach guarantees the convergence of multi-agents. Although the human node xH is not controllable, all the nodes exist in a bounded domain (bounded input, bounded output) and thus provides connected stability for emotional interaction and regulation.

Emotional Interaction Model for Socially Assistive Robotics

In applying the consensus algorithm, we design extra mechanisms for emotional interaction: rapport and character. Since the human agent is not controllable directly, the robot dynamically allocates the goal node to initially approach the human's emotion to form a rapport with the user and then gradually moves the goal emotion to the target emotion for emotional regulation. Thus the consensus algorithm can gradually lead the human's emotion to the desired emotional state with the interactions with the robotic agent and the moving goal emotion.

The second mechanism of character is represented by B( ), which is a character bias function, and aR, which is an approach rate. One simple model can be a linear speed model in which the speed of emotional change on the 2D emotional plan is linear to the output of control algorithm (1). Another example can be a spring-damper model which takes into account of the directional input of emotional change (spring term) and the resistance of abrupt emotional change (damping term) based on the emotional characteristic of the agent.

Figure 17:
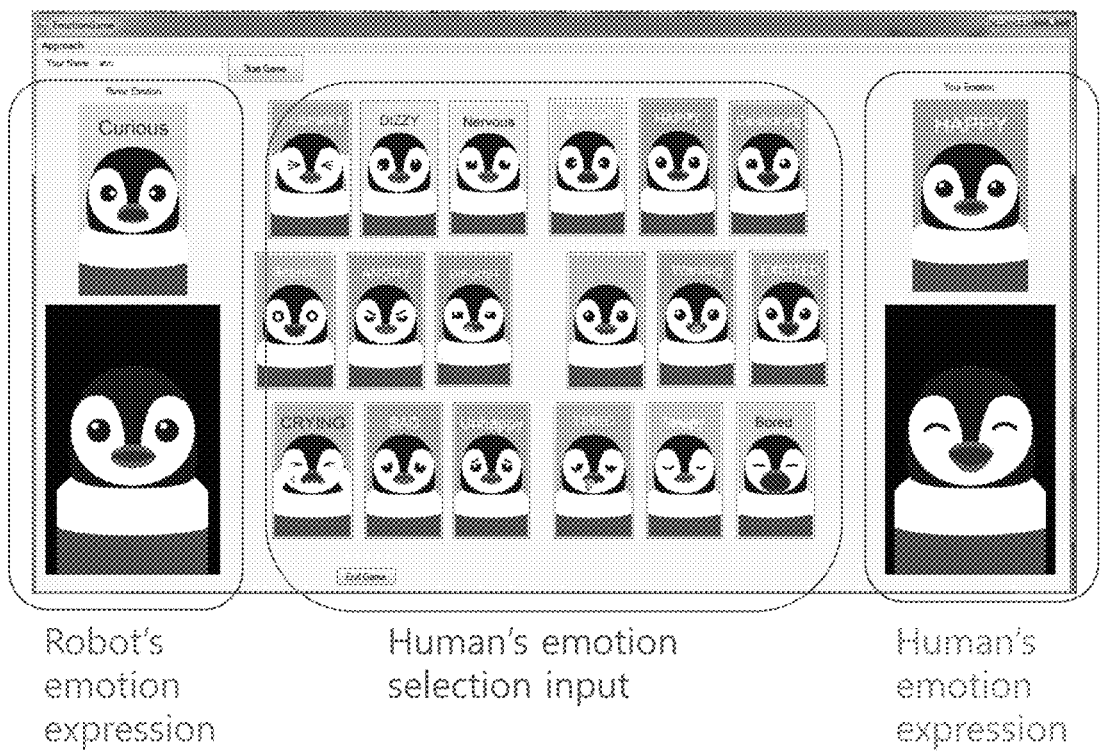
FIG. 17 is a GUI-based emotional interaction game with character-based agents.

To show the feasibility of this methodology, this work employed robotic characters designed in [16] and created a graphical user interface (GUI) based emotional game (as shown in FIG. 17) in which the robotic agent and human expresses emotions in a turn-taking fashion.

The emotional interaction protocol then becomes:
1. Robot expresses its initial emotion (animation in left)
2. Human clicks on the emotional state that are closest 3. Emotional expression of the human user is expressed in the right
4. Robot agent allocates the target goal location and the temporary or default goal (e.g. target="happy" and temp.goal="sad")
5. Robot calculates the consensus algorithm
6. Robot projects its emotion considering the characteristic constraints
7. Robot shows its new emotional expression.

Results

Figure 18:
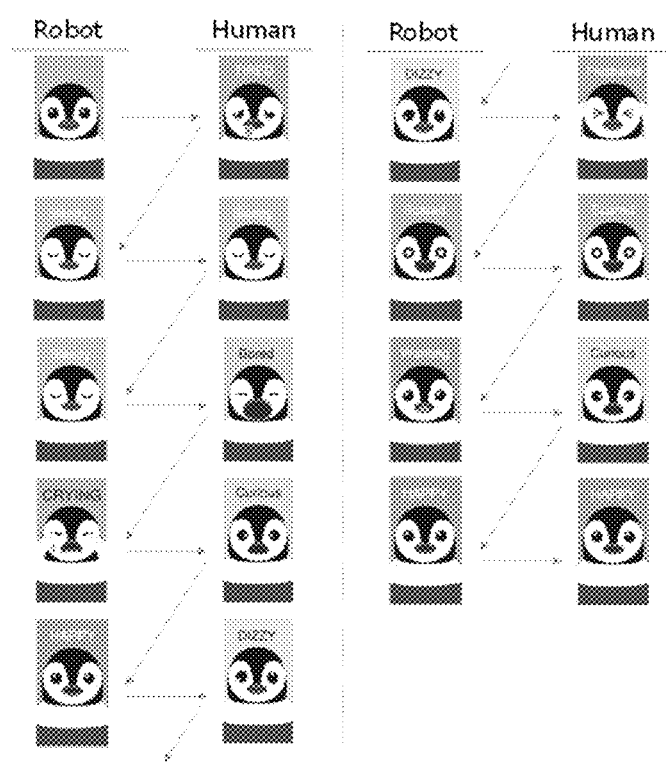
FIG. 18 is an emotion game example with the robot's emotional change model being linear.

FIG. 18 shows one case interaction between the robot and a human user, with the robot calculating its consensus equations based on the linear model for its emotional changes. This model temporarily follows too closely to the human user's emotion (thus showing just "mimicking" of human emotion), but then gradually lead toward positive emotional states.

Figure 19:
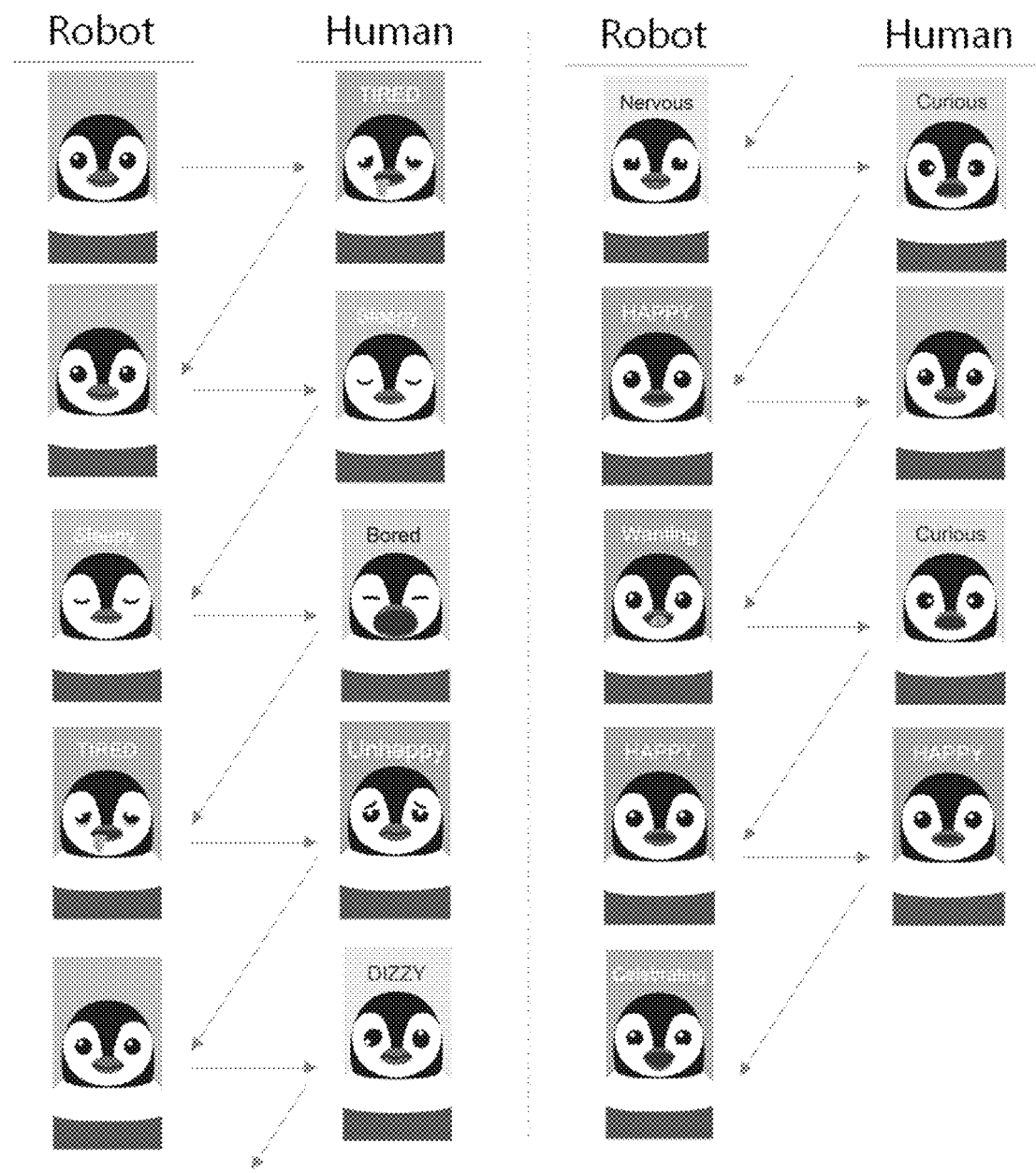
FIG. 19 is an emotion game example with the robot's emotional change model including the damping component.

FIG. 19 shows another case with the robot utilizing the spring-damper model for its characteristic model. The flow of the emotional change can be seen as more "smooth" than the linear model, but sometimes a bit "slow" or "indifferent" to user's emotional change. Based on these two comparative scenarios, we can see that this framework is feasible of modeling different emotional characters as well as interacting with human user while emotionally guiding (regulating) for therapeutic or social purposes.

The system and method of the present invention include operation by one or more processing devices, including the server 112. It is noted that the processing device can be any suitable device, such as a computer, server, mainframe, processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, etc.). The information may be stored on a computer hard drive, on a CD ROM disk or on any other appropriate data storage device, which can be located at or in communication with the processing device. The output from the processing unit can then be converted to control signals to generate auditory signals (such as RAS) through speaker systems or movement sequences through robotic systems. The entire process is conducted autonomously by the processing device without any manual interaction, but also can handle human input as additional information input to increase the dynamics and adaptability of the system.

Referring back to FIG. 11, the various processes of the invention can be implemented at the controller 110 and/or at the output device (e.g., robot 170, audio output 172 such as a speaker, and/or smartphone 174). For instance in FIG. 11, the controller 110 can be located at a central location and communicate with the output device(s) 170, 172, 174. The controller 110 can include a microphone 150 to detect voice or speech signals. The microphone 150 can transmit the speech signals to a voice analyzer 108 to determine emotional dimension labels and associated emotional dimension levels for each of the received speech signals. In addition, the server 110 can include a motion sensor 152, such as a camera, to detect the motion of the user simultaneous with the speech signals. The motion sensor 152 can transmit that data to motion module 102 to determine the body gestures being made by the user, such as movement of the hands or positioning of the head, as discussed with respect to FIGS. 8, 9. Those body gestures are assigned an emotional dimension label and emotional dimension level. In addition, the sound analyzer 106 (FIG. 1) can detect music or other background sound and/or noises from the microphone 150. Those background sounds are assigned an emotional dimension label and emotional dimension level.

The controller 110 receives the emotional dimension labels and the associated emotional dimension levels from each of the voice analyzer 108, and/or the gesture output data from the motion module 102 and/or the background sound data from the sound analyzer 106. Each of the analyzers 102, 106, 108 are preferably used together, but also have separate utility and can be used by themselves or in combination with any one or more of the other analyzers 102, 106, 108. The controller 110 evaluates that information to determine the emotional state of the speaker and the appropriate emotional expression to be generated by the output device 170-174. The controller 110 can also evaluate an emotional goal that is set and also use that information to determine the emotional state of the speaker and the appropriate emotional response expression to be generated by the output devices 170-174. The controller 110 can store the data (including the speech signals, emotional dimension labels, emotional dimension levels, speaker ID information, gesture output data, and determined emotional state). The controller 110 can then send a control or command signal to the output device 170-174 to generate the appropriate expression or response to the user, such as by wired or wireless link.

The motion analyzer 102 can also incorporate physiological signals such as heart rate, body temperature, and Galvanic Skin Response (GSR) sensors (stress level measure), to analyze emotional states. From the volume and pitch of the voice signal, we can also measure engagement level to analyze social engagements between human and robot. The physical distance between human and the robot, as well as the directions of the human user during sessions, can be measured to analyze social engagement and social distances.

However, the operation can be implemented in any suitable manner and still be within the spirit and scope of the invention. For example, the input devices 150 and/or 152, the motion module 102, and/or the speech module 108 and their associated operations, can be integral with and performed by the controller 110, such as at the server 112 (FIGS. 1(a), 1(b)). The analyzers 102, 106, 108 can be separate modules (FIG. 1(a)) that each separately generate motion data, sound data, and speech data and associated emotional dimension labels and levels, respectively.

Or, one or more of the analyzers can be combined into a same module (FIG. 1(b)). For example, a sound feature analysis module can include the acoustic analyzer 106 and voice analyzer 108 to generate sound data that is output the server 112, and also include an emotion estimator to generate a combined emotion data (such as emotional dimension labels and levels) based on both the acoustic analyzer 106 and voice analyzer 108 and output that emotion data to the server 112; while the motion analyzer 102 can be located separately and generate motion data and emotion data that is separately sent to the server 112. Or the input devices 150 and/or 152, the motion module 102, the speech module 108, and/or the controller 110, and their associated operations, can be integral with and performed by the output device 170, 172 and/or 174. Thus, the robot 170 can include a microphone 150 and camera 152, analyze that information to determine emotional dimensional states and levels and gestures, determine the appropriate feedback response, and generate that expression or response output.

In addition, microphone systems can be located both inside a robot and inside a vision sensor 152 (FIG. 11)

outside a robot, which feeds into module 102 (FIG. 1), increasing the perceptiveness of human user's emotional changes in wide indoor areas. The robotic system can capture human emotion better while interacting, and when the human user is away the microphone system in the vision sensor can perform audio analysis. The Kinect sensor 102 can have two types of cameras and 4 microphone arrays.

The system analyzes at least 1000 sound features every 30 ms. Among those thousands of features resulted from signal processing, we find the most relevant features and apply machine-learning based classification model based to perceive emotional responses.

Interactive robotic system has been proven effective in engaging with children with ASD in social and emotional therapy sessions more easily, compared to sessions with human clinicians or teachers, due to the controlled emotional flow. The current robotic systems used for therapies for children with ASD are mostly teleoperated by human, or performs either processes offline perception without any feedback in the system. The present invention has shown effective in increasing the engagement and interactions significantly, and our real-time perception of emotions and its feedback into the system for adaptive and interactive robotic framework can make personalized care possible in therapeutic sessions. For example, RAS is a general approach for rhythm-based therapy, but we can incorporate specific rhythms and auditory signals that are more effective to the child in session based on the child's responses, and find most effective set of stimuli to create personalized sessions. Previous techniques for this purposes only focused on a few features to relate to a limited number of emotion sets, so it was not possible to apply in general interaction scenarios. In the present invention, we utilize as many features we can get from vision sensors as possible to analyze large set of emotions in real-time (or near-real time).

The following references are hereby incorporated by reference: [1] Feil-Seifer, D., and Mataric, M. 2008. Robot-assisted therapy for children with autism spectrum disorders. In Proceedings of the 7th international conference on Interaction design and children, 49-52. ACM.
[2] Thaut, M.; Kenyon, G.; Schauer, M.; and McIntosh, G. 1999. The connection between rhythmicity and brain function. Engineering in Medicine and Biology Magazine, IEEE 18(2):101-108. [3] Kwak, E. E. 2007. Effect of rhythmic auditory stimulation on gait performance in children with spastic cerebral palsy. Journal of music therapy 44(3):198-216.
[4] Pacchetti, C., Mancini, F., Aglieri, R., Fundaro, C., Martignoni, E. and Nappi, G., 2000. Active music therapy in Parkinson's disease: an integrative method for motor and emotional rehabilitation. Psychosomatic medicine, 62(3), pp. 386-393. [5] C. Breazeal, "Emotion and sociable humanoid robots." International Journal of Human-Computer Studies, vol. 59, no. 1, 2003, pp. 119-155. [6] H. R. Kim, K. W. Lee, and D. S. Kwon, "August. Emotional interaction model for a service robot," In IEEE International Workshop on Robot and Human Interactive Communication (ROMAN), 2005, pp. 672-678.
[7] R. Olfati-Saber, A. Fax, and R. M. Murray, "Consensus and cooperation in networked multi-agent systems," Proceedings of the IEEE, vol. 95, no. 1, 2007, pp. 215-233.
[8] A. L. Pais, B. D. Argall, and A. G. Billard. "Assessing interaction dynamics in the context of robot programming by demonstration." International Journal of Social Robotics, vol. 5, no. 4, 2013, pp. 477-490, [9] J. Posner, J. A. Russell, and B. S. Peterson, "The circumplex model of affect: An integrative approach to affective neuroscience, cognitive development, and psychopathology," Development and psycho-pathology, vol. 17, no. 3, 2005, pp. 715-734. [10] T. Lourens, R. Van Berkel, and E. Barakova, "Communicating emotions and mental states to robots in a real time parallel framework using Laban movement analysis," Robotics and Autonomous Systems, 58(12), 1256-1265, 2012. [11] Bernhardt, D. Emotion Inference from Human Body Motion. Diss. U of Cambridge, n.d. N.p.: n.p., n.d. Print. [12] Rett, Jorg, Jorge Dias, and Juan Manuel Ahuactzin. "Bayesian Reasoning for Laban Movement Analysis Used in Human-machine Interaction." International Journal of Reasoning-based Intelligent Systems IJRIS 2.1 (2010): 13. Web. [13] Morita, J., Nagai, Y. and Moritsu, T., 2013. Relations between Body Motion and Emotion: Analysis based on Laban Movement Analysis. In CogSci. [14] Wakayama, Y., Okajima, S., Takano, S. and Okada, Y., 2010, September. IEC-based motion retrieval system using laban movement analysis. In International Conference on Knowledge-Based and Intelligent Information and Engineering Systems (pp. 251-260). Springer Berlin Heidelberg.
[15] Masuda, M., Kato, S. and Itoh, H., 2009, December. Emotion detection from body motion of human form robot based on laban movement analysis. In International Conference on Principles and Practice of Multi-Agent Systems (pp. 322-334). Springer Berlin Heidelberg. [16] R. Bevill, C. H. Park, H. J. Kim, J. W. Lee, A. Rennie, M. Jeon, and A. M. Howard, "Interactive robotic framework for multi-sensory therapy for children with autism spectrum disorder," in 2016 11th ACM/IEEE International Conference on Human-Robot Interaction (HRI, pp. 421-422), 2016. [17] M. Jeon, R. Zhang, W. Lehman, S. Fakhrhosseini, J. Barnes, and C. H. Park, "Development and Evaluation of Emotional Robots for Children with Autism Spectrum Disorders." In International Conference on Human-Computer Interaction, pp. 372-376. Springer International Publishing, 2015. [18] Busso, Carlos, Murtaza Bulut, Chi-Chun Lee, Abe Kazemzadeh, Emily Mower, Samuel Kim, Jeannette N. Chang, Sungbok Lee, and Shrikanth S. Narayanan. "IEMOCAP: Interactive emotional dyadic motion capture database." Language resources and evaluation 42, no. 4 (2008): 335. [19] A. Metallinou, M. Wollmer, A. Katsamanis, F. Eyben, B. Schuller, and S. Narayanan,"Context-sensitive learning for enhanced audiovisual emotion classification," Affective Computing, IEEE Transactions on, vol. 3, no. 2, pp. 184-198, 2012.
[20] F. Eyben, M. Wöllmer, and B. Schuller, "OpenSMILE: The Munich versatile and fast open-source audio feature extractor," Proceedings of the International Conference on Multimedia, Singapore, pp. 1459-1462, 2010. [21] Kim, Jonathan C., and Mark A. Clements. "Multimodal affect classification at various temporal lengths." IEEE Transactions on Affective Computing 6, no. 4 (2015): 371-384. [22] R.-E. Fan, K.-W. Chang, C.-J. Hsieh, X.-R. Wang, and C.-J. Lin, "Liblinear: A library for large linear classification," The Journal of Machine Learning Research, vol. 9, pp. 1871-1874, 2008. [23] Kim, Jonathan C., and Mark A. Clements. "Formant-based feature extraction for emotion classification from speech." Telecommunications and Signal Processing (TSP), 2015 38th International Conference on. IEEE, 2015.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An emotional interaction system, comprising:
an audio input device receiving speech signals from a speaker;
a voice analyzer configured to:
(A) during a configuration stage:
receive configuration speech signals from the speaker by the audio input device, wherein a duration of the configuration speech signals is shorter than 5 minutes;
extract configuration features from the configuration speech signals; and
obtain configuration feature values for the speaker by calculating mean values of the configuration features;
(B) during a test:
receive the speech signals from the audio input device from the speaker;
extract speech features from the received speech signals;
obtain test speech features corresponding to the received speech signals by subtracting configuration feature values from the extracted speech features;
determine at least one speech emotional dimensional label selected from a set of emotional dimension labels for each of the speaker signals for the speaker, wherein the set of emotional dimension labels includes at least one of activation, valence, and/or dominance; and
using the test speech features, determine a speech emotional dimension level associated with at least one speech emotional dimension label corresponding to each of the speech signals, wherein the emotional dimension level includes a high state, a neutral state, and a low state;
(C) during training:
train a classifier for each of the set of emotional dimensional labels, using normalized training speech features of a plurality of speakers, wherein the normalized training speech features are obtained by a normalization process, the normalization process comprising:
for each of the plurality of speakers,
a) extracting speech features corresponding to all of the high state, the neutral state, and the low state associated with each emotional dimensional label,
b) obtaining a subset of the extracted speech features, wherein the subset is randomly selected from the extracted speech features associated only with the neutral state of the at least one emotional dimensional label,
c) calculating mean values of the subset of the extracted speech features, and
d) obtaining the normalized training speech features by subtracting the calculated mean values from the extracted speech features associated with all of the high state, the neutral state, and the low state;
an emotion controller configured to:
receive the determined speech emotional dimension label and the determined speech emotional dimension level; and
select a responsive emotional expression and/or responsive gestural behavior of the system based on the determined speech emotional dimension label and the determined speech emotional dimension level of the speaker, wherein the responsive emotional expression and/or responsive gestural behavior of the system being responsive to and different from the determined speech emotional dimension label and the determined speech emotional dimension level of the speaker; and
an output device configured to present the selected responsive emotional expression and/or gestural behavior to the speaker.

2. The system of claim 1, said voice analyzer further configured to extract acoustic and prosodic features from the speech signals using a feature extraction toolkit to provide a feature set, wherein a dimension of the acoustic and prosodic features is larger than 1000, and
wherein the feature extraction toolkit 1) segments the speech signals into frames shorter than a duration of 50 millisecond, 2) for each frame, analyzes acoustic and prosodic patterns, 3) measures temporal patterns of the analyzed acoustic and prosodic patterns using at least one of statistical and regression measures, and 4) outputs the measured temporal patterns as the acoustic prosodic features.

3. The system of claim 2, said voice analyzer further configured to obtain a reduced feature set, wherein a dimension of the reduced feature set is reduced by applying at least one of a principal component analysis (PCA), linear discriminant analysis (LDA), and a feature selection algorithm on the extracted acoustic and prosodic features.

4. The system of claim 3, said voice analyzer further configured to obtain a personal speech feature set, wherein the personal speech feature set is the reduced feature set corresponding to a particular person's voice of a plurality of speakers in the database.

5. The system of claim 4, said voice analyzer further configured to obtain a configuration feature set, wherein a duration of the configuration feature set is shorter than 5 minutes, wherein the configuration feature set is a subset of the obtained speaker feature set and includes acoustic and prosodic features collected in a neutral emotional state, wherein the subset corresponds to the neutral state.

6. The system of claim 5, said voice analyzer further configured to obtain a training data, wherein the training data is obtained by:
calculating a mean of the configuration feature set;
calculating variances of the subset of the configuration feature set;
obtaining the normalized speech features by dividing, using the calculated variance values, the extracted speech features associated with all of the high state, the neutral state, and the low state; and
outputting the normalized data as a training data.

7. The system of claim 6, said voice analyzer further configured to train a classifier using the training data, wherein the classifier is one of a support vector machine, a Gaussian mixture model, a hidden-Markov model, and an deep neural network.

8. The system of claim 1, said audio input device configured to receive audio signals containing said speech signals and acoustic and prosodic data.

9. The system of claim 8, said voice analyzer further configured to extract second acoustic and prosodic features from the received audio signals, the second acoustic and prosodic features forming a second extracted feature set having second acoustic and prosodic feature dimensions.

10. The system of claim 9, said voice analyzer further configured to obtain a second reduced feature set of the extracted second acoustic and prosodic feature dimensions, wherein the second reduced feature set is smaller than the second extracted feature set.

11. The system of claim 10, said voice analyzer further configured to calculate the final data, wherein the final data is calculated by:
subtracting the calculated mean from the second reduced feature set to obtain a second subtracted data;
dividing the second subtracted data by the calculated variance to obtain a second normalized data; and
outputting the second normalized data as the final data.

12. The system of claim 11, said voice analyzer further configured to classify the final data into the emotional dimension level.

13. The system of claim 1, wherein valence comprises pleasure, and the emotional dimensional label comprises arousal.

14. The system of claim 1, wherein said output device comprises a robot.

15. The system of claim 1, further comprising:
a motion sensor configured to detect movement of the speaker; and
a motion module, implemented by one or more processors, configured to receive the detected movement and determine at least one motion emotional dimensional label from the set of emotional dimension labels for each of the detected movement, and determine a motion emotional dimension level associated with each motion emotional dimension label;
wherein said emotion controller is further configured to receive the detected speaker gestural behavior and select the responsive emotional expression and/or gestural behavior based on the at least one speech emotional dimension label, speech emotional dimension level, motion emotional dimension label, and motion emotional dimension level.

16. The system of claim 15, wherein the detected movement comprises movement of the speaker and movement of the speaker's arms, head, torso, and/or hip joints.

17. The system of claim 16, wherein the detected movement comprises weight term, time term, motion units, range of motion, postures, direction of motion.

18. The system of claim 17, wherein the weight term comprises representative power of joint motion, the time term comprises representative speed of joint motion, and motion units comprises identifiable independent motion sequences.

19. The system of claim 1,
wherein said emotion controller selects a responsive emotional expression and/or gestural behavior with a human emotion, robot emotion, and goal emotion.

20. The system of claim 19, wherein said emotion controller selects a responsive emotional expression and/or gestural behavior based on a consensus algorithm with approach rate control.

21. The system of claim 19, wherein said emotion controller selects a responsive emotional expression and/or gestural behavior based on a predetermined emotional goal.

22. The system of claim 1, wherein said voice analyzer and emotional controller comprise a processing device.

23. The system of claim 1, further comprising:
wherein the audio input device detects background noise; and
a background module, implemented by one or more processors, configured to receive the background noise, determine at least one background emotional dimensional label from the set of emotional dimension labels for each of the background noise, and determine a background emotional dimension level associated with each background emotional dimension label;
wherein said emotion controller is further configured to receive the detected speaker gestural behavior and select the responsive emotional expression and/or gestural behavior based on the at least one speech emotional dimension label, speech emotional dimension level, background emotional dimension label, and background emotional dimension label.

24. A method for interacting with a speaker, comprising:
receiving, by an audio input device, speech signals from the speaker;
(A) during a configuration stage:
receiving configuration speech signals from the speaker by the audio input device, wherein a duration of the configuration speech signals is shorter than 5 minutes;
extracting configuration features from the configuration speech signals; and
obtaining configuration feature values for the speaker by calculating mean values of the configuration features;
(B) during a test:
receiving the speech signals from the audio input device from the speaker;
extracting the speech features from the received speech signals;
obtaining test speech features corresponding to the received speech signals by subtracting a configuration feature set from the extracted features;
determining at least one speech emotional dimensional label selected from a set of emotional dimension labels for each of the speaker signals for the speaker, wherein the set of emotional dimension labels includes at least one of activation, valence, and/or dominance; and
using the test speech features, determining a speech emotional dimension level associated with at least one speech emotional dimension label corresponding to each of the speech signals, wherein the emotional dimension level includes a high state, a neutral state, and a low state:
(C) during training:
training a classifier for each of the set of emotional dimensional labels, using normalized training speech features of a plurality of speakers, wherein the normalized training speech features are obtained by a normalization process, the normalization process comprising:
for each of the plurality of speakers,
a) extracting speech features corresponding to all of the high state, the neutral state, and the low state associated with each emotional dimensional label,
b) obtaining a subset of the extracted speech features, wherein the subset is randomly selected from the extracted features associated only with the neutral state of the at least one emotional dimensional label,
c) calculating mean values of the subset of the extracted speech features, and
d) obtaining the normalized speech features by subtracting the calculated mean values from the extracted speech features associated with all of the high state, the neutral state, and the low state;
and
presenting, by an output device, the selected responsive emotional expression and/or gestural behavior to the speaker.

* * * * *